(12) United States Patent
Tsurumi et al.

(10) Patent No.: US 10,507,747 B2
(45) Date of Patent: Dec. 17, 2019

(54) CONVEYANCE SEAT

(71) Applicants: TS TECH CO., LTD., Asaka-shi, Saitama (JP); HONDA MOTOR CO., LTD., Tokyo (JP)

(72) Inventors: Kazuhiro Tsurumi, Tochigi (JP); Ryuji Isobe, Tochigi (JP); Shinichiro Motoda, Tochigi (JP); Yuichi Honma, Tochigi (JP); Gen Tanabe, Saitama (JP); Daichi Ito, Saitama (JP); Takeshi Sugimoto, Saitama (JP); Keishi Takayama, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/938,170

(22) Filed: Mar. 28, 2018

(65) Prior Publication Data
US 2018/0281640 A1 Oct. 4, 2018

(30) Foreign Application Priority Data

Mar. 29, 2017 (JP) ................................ 2017-064346
Mar. 29, 2017 (JP) ................................ 2017-064347
Mar. 29, 2017 (JP) ................................ 2017-064348

(51) Int. Cl.
*B60N 2/70* (2006.01)
*B60N 2/56* (2006.01)
(Continued)

(52) U.S. Cl.
CPC ............. *B60N 2/5685* (2013.01); *B60N 2/70* (2013.01); *B62J 1/12* (2013.01); *B62J 1/28* (2013.01); *B62J 33/00* (2013.01)

(58) Field of Classification Search
CPC .......... B60N 2/5685; B60N 2/70; B60N 2/56; B60N 2/5678; B62J 1/12; B62J 1/28; B62J 33/00
(Continued)

(56) References Cited

U.S. PATENT DOCUMENTS

| 4,633,061 A | 12/1986 | Arikawa |
| 4,865,379 A | 9/1989 | Aoki et al. |

(Continued)

FOREIGN PATENT DOCUMENTS

| DE | 10 2005 058 491 A1 | 9/2006 |
| DE | 10 2011 119 260 A1 | 2/2013 |

(Continued)

OTHER PUBLICATIONS

Extended European Search Report issued in related application EP 18163391.8, Aug. 21, 2018, 6 pages.
(Continued)

*Primary Examiner* — Mark R Wendell
(74) *Attorney, Agent, or Firm* — Drinker Biddle & Reath LLP

(57) ABSTRACT

A conveyance seat configured to stabilize a position of a temperature detection unit to suppress positional deviation of the temperature detection unit is described. The conveyance seat comprises a cushion pad, a bottom plate, an electric heater which is attached to the cushion pad, a thermistor which detects temperature at a location between the cushion pad and the bottom plate during operation of the electric heater, a housing cavity with a hollowed shape formed in a bottom portion of the cushion pad, and a holding pad which holds the thermistor within the housing cavity by being fit in the housing cavity with the thermistor attached (Continued)

thereto. The thermistor is held by the holding pad, and is positioned between the cushion pad and the holding pad, within the housing cavity.

20 Claims, 33 Drawing Sheets

(51) Int. Cl.
*B62J 1/12* (2006.01)
*B62J 1/28* (2006.01)
*B62J 33/00* (2006.01)

(58) Field of Classification Search
USPC .......................................... 297/180.12, 180.1
See application file for complete search history.

(56) References Cited

U.S. PATENT DOCUMENTS

| | | | | |
|---|---|---|---|---|
| 5,658,050 | A * | 8/1997 | Lorbiecki | B62J 1/12 297/452.41 |
| 10,017,221 | B2 * | 7/2018 | Uemura | B62J 1/12 |
| 2002/0030601 | A1 | 3/2002 | Yano et al. | |
| 2007/0215601 | A1 | 9/2007 | Frank | |
| 2008/0238159 | A1 | 10/2008 | Parnis et al. | |
| 2011/0156453 | A1 | 6/2011 | Matsushima | |
| 2015/0224006 | A1 * | 8/2015 | Primo | A47C 7/744 297/180.14 |
| 2017/0217523 | A1 * | 8/2017 | Uemura | B62J 1/12 |
| 2019/0061574 | A1 * | 2/2019 | Schwintek | B60N 2/5642 |

FOREIGN PATENT DOCUMENTS

| | | |
|---|---|---|
| JP | S57-046080 U | 3/1982 |
| JP | S60-014786 A | 1/1985 |
| JP | 2000-189282 A | 7/2000 |
| JP | 2001-046176 A | 2/2001 |
| JP | 2002-029480 A | 1/2002 |
| JP | 2007-022187 A | 2/2007 |
| JP | 2007-513827 A | 5/2007 |
| JP | 2007-283856 | 11/2007 |
| JP | 2011-131856 A | 7/2011 |
| JP | 2012-011138 A | 1/2012 |
| JP | 2012-225880 A | 11/2012 |
| JP | 2012-239797 A | 12/2012 |
| JP | 2013-237363 A | 11/2013 |

OTHER PUBLICATIONS

Office Action issued in related application JP 2017-064348, dated Sep. 4, 2018, with machine generated English language translation, 7pages.

Office Action issued in related application JP 2017-064346, dated Sep. 4, 2018, with machine generated English language translation, 9 pages.

Office Action issued in related application JP 2017-064346, dated Apr. 2, 2019, with machine generated English language translation, 8 pages.

* cited by examiner

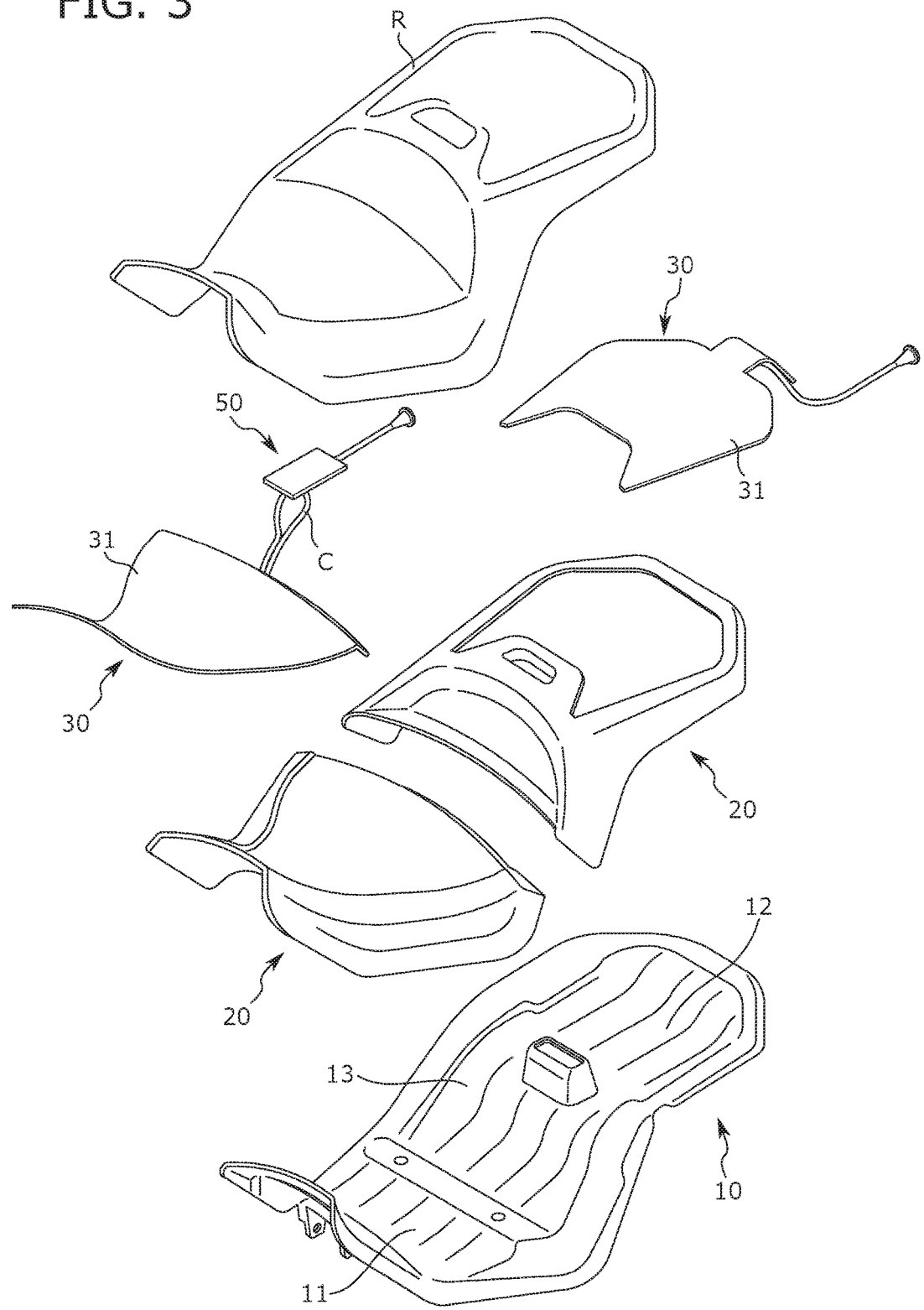

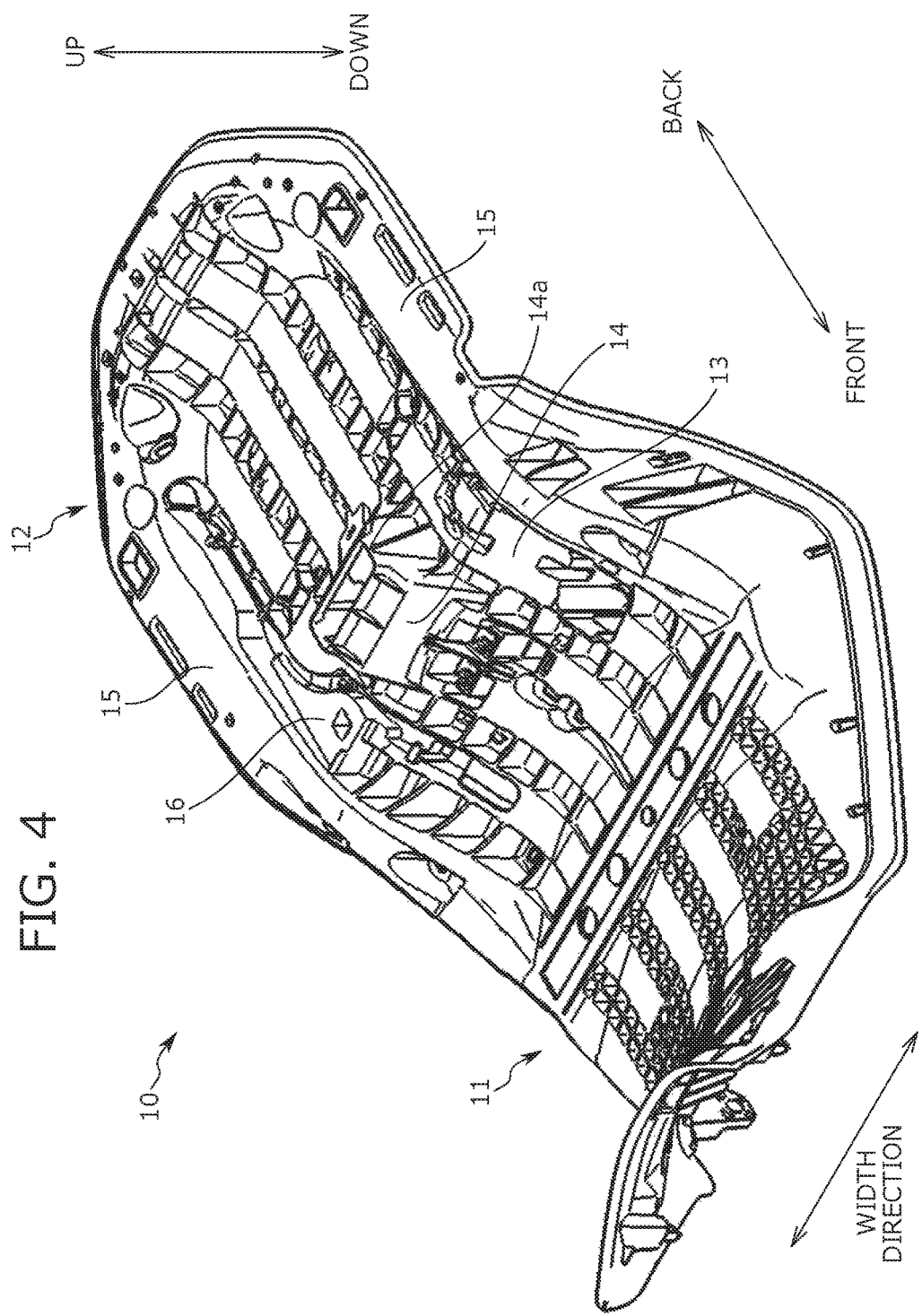

FIG. 29
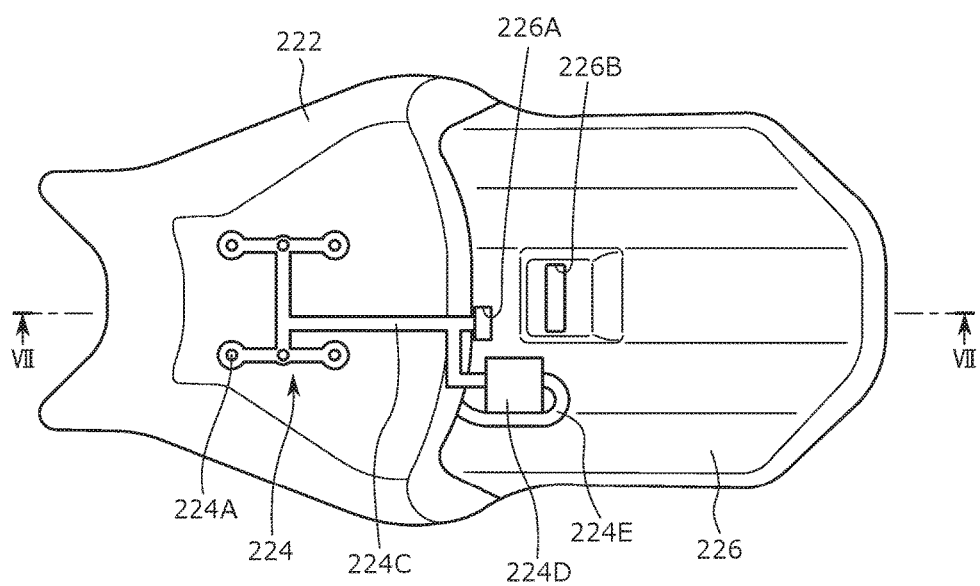
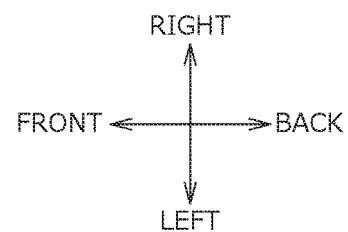

CONVEYANCE SEAT

CROSS REFERENCE TO RELATED APPLICATIONS

This application is based upon and claims the priority benefit of Japanese Patent Application Nos. JP 2017-064348, JP 2017-064347 and JP 2017-064346, filed Mar. 29, 2017, the contents of each of which are incorporated herein by reference in their entireties.

BACKGROUND

The present disclosure relates to a conveyance seat, particularly to a conveyance seat having a composition in which a temperature control unit is attached to a cushion pad which is placed on a bottom wall, and a temperature is detected at a location between the cushion pad and the bottom wall by a temperature detection unit during operation of the temperature control unit.

Some existing conveyance seats are seats having a temperature control unit such as an electric heater, attached to a cushion pad placed on a bottom wall. In seats equipped with a temperature control unit, in order to control an operating condition of the temperature control unit, a temperature inside the seat is detected during an operation of the temperature control unit, and according to the detected result, an operating condition of the temperature control unit is controlled, in some cases. In the composition above, a means for detecting a temperature inside the seat (temperature detection unit) is arranged between a bottom wall and a cushion pad (for example, see Japanese Patent Publication JP 2011-131856 A).

In JP 2011-131856 A, a thermistor as a temperature detection unit is arranged between a bottom plate as a bottom wall and a cushion pad, in a seat for two-wheeled vehicle equipped with a seat heater. More specifically, a concave portion with a hollowed shape is formed in a portion in the cushion pad facing the bottom plate, and the thermistor is housed in the concave portion. The thermistor, being housed in the concave portion, detects a temperature inside the seat (specifically, a temperature inside the concave portion).

However, in the composition described in JP 2011-131856 A, there is a possibility that the thermistor housed in the concave portion moves therein (i.e., a positional deviation occurs), and the condition of having varied position of the thermistor causes variation in the detected temperatures.

SUMMARY

The present disclosure has been made in consideration of the above problem, and an embodiment provides a conveyance seat configured to stabilize a position of a temperature detection unit in the seat.

According to an embodiment of the conveyance seat of the present disclosure, the problem is solved by the embodiment comprising: a cushion pad; a bottom wall on which the cushion pad is placed; a temperature control unit which is attached to the cushion pad; a temperature detection unit configured to detect a temperature at a location between the cushion pad and the bottom wall during an operation of the temperature control unit; a housing unit with a hollowed shape which is formed on either one of the cushion pad or the bottom wall, in a portion facing an other of the cushion pad or the bottom wall; a holding unit which is housed in the housing unit, with the temperature detection unit attached thereto, to thereby hold the temperature detection unit within the housing unit; in which the temperature detection unit is held by the holding unit, and positioned between the cushion pad and the holding unit within the housing unit.

In the conveyance seat of the present disclosure configured as above, the housing unit with a hollowed shape is formed on either one of the cushion pad and the bottom wall, in a portion facing the other. To the housing unit, the holding unit in a state of having the temperature detection unit attached thereto is fit in. In this manner, the temperature detection unit is held in a state of being positioned between the cushion pad and the holding unit, within the housing unit. As a result, it becomes possible to stabilize the position of the temperature detection unit in the housing unit, and to suppress a positional deviation of the temperature detection unit.

In the above composition, it is preferred that the bottom wall be provided with a protruding portion which protrudes at a position in the side of the holding unit, and that the protruding portion be in contact with the bottom face of the cushion pad. In the above composition, the protruding portion provided to the bottom wall is in a position in the side of the holding unit. The protruding portion is in contact with the bottom face of the cushion pad. When a load is applied to the cushion pad, such a composition allows to suppress the cushion pad from being deformed or displaced, with the presence of the protruding portion ahead in a direction in which the load acts. As a result, it becomes possible to suppress a positional deviation of the holding unit and the temperature detection unit due to a deformation or a displacement of the cushion pad.

In the above composition, it is also preferred that the protruding portion be a convex portion protruding toward the side of the bottom wall on which the cushion pad is positioned, in the thickness direction of the conveyance seat, and that a protrusion size of the convex portion be longer than a length of the holding unit in the thickness direction. In the above composition, the protruding portion (convex portion) longer than the holding unit protrudes toward the side in which the cushion pad is positioned, in the thickness direction of the conveyance seat. This makes the convex portion receive a pressing load, for example, when the cushion pad is pressed from above. Such a composition allows suppressing a positional deviation of the holding unit and the temperature detection unit, when a load is applied to the cushion pad in the thickness direction of the conveyance seat.

In the above composition, it is also preferred that the protruding portion be a fore wall which is provided forward of the holding unit in the front to back direction of the conveyance seat, and that the fore wall protrude toward the side in which the cushion pad is positioned, in the thickness direction of the conveyance seat. In the above composition, the protruding portion (fore wall) protruding toward the side in which the cushion pad is positioned, in the thickness direction of the conveyance seat, is provided forward of the holding unit. This makes the fore wall receive a pressing load, for example, when the cushion pad is pressed from the front. Such a composition allows inhibiting a positional deviation of the holding unit and the temperature detection unit, when a load is applied to the cushion pad from the front of the conveyance seat.

In the above composition, it is also preferred that the protruding portion be a lateral side wall provided in an outer side of the bottom wall relative to the holding unit in the front to back direction of the conveyance seat, and that the lateral wall protrude toward the side in which the cushion pad is positioned, in the thickness direction of the conveyance seat. In the above composition, the protruding portion (lateral wall) protruding toward the side in which the cushion pad is positioned, in the thickness direction of the conveyance seat, is provided in an outer side than the holding unit in the width direction of the conveyance seat. This makes the lateral side wall receive a pressing load, for example, when the cushion pad is pressed from a lateral side. Such a composition allows inhibiting a positional deviation of the holding unit and the temperature detection unit, when a load is applied to the cushion pad from a lateral side of the conveyance seat.

In the above composition, it is also preferred that: the temperature detection unit output a signal according to a detected temperature; a cable forming a transmission path of the signal be connected to the temperature detection unit; the housing unit be formed on a bottom portion of the cushion pad; and in the bottom portion of the cushion pad, a concave portion for a portion of the cable coming outside of the housing unit from the end of the housing unit to come into be formed in a bottom portion of the cushion pad that is adjacent to the housing unit. In the above composition, the cable forming a transmission path of a signal output from the temperature detection unit (specifically, a portion coming outside of the housing unit) comes into the concave portion adjacent to the housing unit in the bottom portion of the cushion pad. This allows suppressing the cable from being crushed by a load applied to the cushion pad, at a sitting on the seat.

In the above composition, it is also preferred that the temperature detection unit be attached to the holding unit and is wrapped with a cushioning material, and that the cushioning material wrapping the temperature detection unit be sandwiched between the holding unit and the cushion pad, in the housing unit. In the above composition, the cushioning material is arranged between the temperature detection unit and the cushion pad or the holding unit. Such a composition allows protecting the temperature detection unit by alleviating the load applied to the temperature detection unit with the cushioning material.

In the above composition, the conveyance seat is mounted and exposed outward in a conveyance, and it is also preferred that the holding unit comprise a cushioning material having a heat-insulating property. In the above composition, inside space of the housing unit is thermally insulated with the holding unit and the cushion pad. This allows the temperature detection unit in the housing unit to detect a seat temperature with high accuracy, even in a condition that a conveyance seat itself is exposed in the outside air. As a result, a control based on a detected temperature by the temperature control unit becomes accurately performed.

In the above conveyance seat, it is also preferred that: the cushion pad comprise a bank portion provided in the peripheral portion, a groove provided in a position adjacent to the bank portion, a supporting face which supports an occupant, a covering which covers the cushion pad where an end portion is drawn into the groove, an electric heater attached to the supporting face, and a leading line provided for electric power supply to the electric heater; and that the cushion pad be provided with a hole formed in a bottom portion of the groove, and the leading line be equipped with a connecting portion connected to the electric heater on a same side as the supporting face in the thickness direction of the cushion pad, and a successive portion which is successive to the connecting portion and passed through the hole.

In the conveyance seat of the present disclosure configured as above, the leading line for electric supply to the electric heater comprises a portion to be connected to the electric heater in the same side with the supporting face in the thickness direction of the cushion pad (connecting portion), and a portion successive to the portion (successive portion). The successive portion passes through the hole formed in a bottom portion of the groove of the cushion pad. This hole is in a position difficult to be applied with a load, when an occupant is seated on the conveyance seat. Therefore, in routing the leading line, if the successive portion of the leading line is passed through the hole, it is possible to inhibit the load (sitting load) from being applied to the leading line to disconnect the leading line, when an occupant is seated on the conveyance seat. That is to say, the above composition allows the leading line to be appropriately routed inside the conveyance seat.

In the above conveyance seat, it is also preferred that a concave portion be formed on the bottom face of the cushion pad which is positioned in the opposite side of the supporting face in the thickness direction, and a portion of the successive portion which is passed through the hole and reached a position facing the bottom face come into the concave portion. In the above composition, the leading line that comes around to the backside of the cushion pad (successive portion) comes into the concave portion formed in the bottom face of the cushion pad which is positioned in the opposite side of the supporting face in the thickness direction (namely, the backside of the cushion pad). In such a composition, it becomes difficult for a load (sitting load) to be applied to the leading line come into inside the concave portion.

In the above conveyance seat, it is also preferred that; the cushion pad comprise an adjacent portion which is adjacent to the groove at the opposite side of the bank portion; the electric heater comprise a substrate shaped into a pad, the substrate being attached to the supporting face, so that an edge of one end portion of the substrate is along an edge, in the groove side-end adjacent to the groove, of the adjacent portion; the one end portion of the substrate comprise an extending portion which extends to fix the successive portion, the extending portion being bent downward at the edge of the groove side-end, and passed through the hole together with the successive portion. In the above composition, an extending portion is provided to one end portion of the substrate shaped into a pad of the electric heater, and the successive portion of the leading line is fixed to the extending portion. The extending portion is bent downward at the edge of the end portion of the adjacent portion (the groove side-end) in the cushion pad, and passed through the hole together with the successive portion. Such a composition facilitates passing of the successive portion through the hole, and allows the portion of the successive portion passed through the hole to be protected.

In the above conveyance seat, it is also preferred that a notch be provided to the groove side-end of the adjacent portion, in a portion facing the extending portion, and that the bent portion of the extending portion, bent downward at the edge of the groove side-end and comes into the notch. In the above composition, the extending portion bent downward at the edge of the groove side-end (bent portion) comes into the notch provided to the end portion of the adjacent portion (the groove side-end), in a portion facing the extending portion. Such a composition allows suppressing a seat appearance from being influenced by the bent portion of the extending portion when stuck outward from the edge of the groove side-end.

In the above conveyance seat, it is also preferred that the notch be formed such that an end face of the bent portion which comes into the notch, in the same side with the groove, is flush with a face of the groove side-end, positioned in the edge. In the above composition, the notch is formed such that an end face (the end face in the same side with the groove) of the bent portion that comes into the notch is flush with a face of the groove side-end, positioned in the edge. Such a composition allows minimizing an influence of the bent portion of the extending portion to a seat appearance.

In the above conveyance seat, it is also preferred that: a cushioning material be attached to the extending portion; the successive portion be fixed to the extending portion and is sandwiched between the extending portion and the cushioning material; and the extending portion pass through the hole together with the successive portion and the cushioning material. In the above composition, a portion of the successive portion is fixed to the extending portion with being sandwiched between the extending portion and the cushioning material, and passes through the hole in the above state. This alleviates a load applied to the successive portion when an occupant is seated on the conveyance seat, and allows inhibiting disconnection of the leading line.

In the above conveyance seat, it is also preferred that: the conveyance seat be equipped with a supporting member in which a through hole is formed, a first cushion member arranged above the supporting member, a seating sensor arranged between the supporting member and the first cushion member; and that the seating sensor comprise a contact point unit and an intake/exhaust port unit which communicates with the contact point unit, and the intake/exhaust port unit be passed through the through hole of the supporting member. According to the above conveyance seat, it is possible to prevent the intake/exhaust port unit of the seating sensor from being crushed by the load of an occupant. This secures an intake/exhaust function of the seating sensor, to allow operation accuracy of the seating sensor to be improved. By protecting the intake/exhaust port unit of the seating sensor with the supporting member, it is also possible to prevent the intake/exhaust port unit from being damaged.

In the above conveyance seat, it is also preferred that the intake/exhaust port unit be passed through the through hole of the supporting member and is arranged below the supporting member. By arranging the intake/exhaust port unit of the seating sensor below the supporting member in this manner, it is possible to expose the intake/exhaust port unit. This allows a stabilized intake of the outside air at the intake/exhaust port unit. Since the intake/exhaust port unit can be separated from the first cushion member, it is possible to inhibit a composition material of the first cushion member from coming in from the intake/exhaust port unit.

In the above conveyance seat, it is also preferred that the conveyance seat be further equipped with a second cushion member arranged over the supporting member, the first cushion member be arranged above the second cushion member, and the seating sensor be arranged between the first cushion member and the second cushion member. By sandwiching the seating sensor with the first cushion member and the second cushion member in this manner, it is possible to protect the seating sensor.

In the above conveyance seat, it is also preferred that the first cushion member comprise a rubber material containing a sulfur component. In this manner, it is possible to improve a cushioning performance. Since it is possible also in such a case to inhibit the sulfur component from coming in from the intake/exhaust port unit of the seating sensor, it is possible to prevent performance degradation of the contact point unit.

In the conveyance seat, it is also preferred that a seat heater is arranged over the seating sensor. In this manner, it is possible to prevent an immersion of a dew condensation produced by a heat of the heater. This allows preventing a corrosion of the seating sensor, to extend life of the seating sensor. According to the above composition, it is also possible to improve comfort of the conveyance seat. Since it is possible also in such a case to arrange the intake/exhaust port unit of the seating sensor to a position which is not in contact with the seat heater, it is possible to prevent a damage of the intake/exhaust port unit due to the heat.

According to an embodiment of the conveyance seat of the present disclosure, it becomes possible to stabilize position of a temperature detection unit in a housing unit, and to suppress a positional deviation of the temperature detection unit. According to an embodiment of the conveyance seat of the present disclosure, it becomes also possible to suppress a positional deviation of a holding unit and a temperature detection unit, when a load is applied to a cushion pad. According to an embodiment of the conveyance seat of the present disclosure, it becomes also possible to suppress a positional deviation of a holding unit and a temperature detection unit, when a load is applied to a cushion pad in the thickness direction of a conveyance seat. According to an embodiment of the conveyance seat of the present disclosure, it becomes also possible to suppress a positional deviation of a holding unit and a temperature detection unit, when a load is applied to a cushion pad from the front of a conveyance seat. According to an embodiment of the conveyance seat of the present disclosure, it becomes also possible to suppress a positional deviation of a holding unit and a temperature detection unit, when a load is applied to the cushion pad from a lateral side of a conveyance seat. According to an embodiment of the conveyance seat of the present disclosure, it becomes also possible to inhibit a cable forming a transmission path of a signal output from a temperature detection unit from being crushed, while an occupant is seated on the seat. According to an embodiment of the conveyance seat of the present disclosure, it becomes also possible to protect a temperature detection unit by alleviating a load applied to the temperature detection unit with a cushioning material. According to an embodiment of the conveyance seat of the present disclosure, it becomes also possible that a temperature detection unit in a housing unit detects a seat temperature with a high accuracy, even in a condition that a conveyance seat itself is exposed in the outside air. As a result, a control based on a detected temperature by a temperature control unit becomes accurately performed. According to an embodiment of the conveyance seat of the present disclosure, a leading line for electric supply to an electric heater becomes appropriately routed inside a seat. In addition, according to an embodiment of the conveyance seat of the present disclosure, the leading line comes around to the backside of a cushion pad (successive portion) and comes into a concave portion formed in the bottom face positioned in the backside of a cushion pad, to thereby make it difficult for a load (sitting load) to be applied to the leading line come into inside the concave portion. In addition, according to an embodiment of the conveyance seat of the present disclosure, it becomes easy to pass a leading line (successive portion) through a hole formed for a leading line to come around to the backside of a cushion pad, to allow protecting a portion passing through the hole of the leading line. In addition, according to an embodiment of the conveyance seat of the present disclosure, when an extending portion provided to a substrate of an electric heater is bent downward at an edge of an end portion (a groove side-end) of an adjacent portion adjacent to the groove portion in a cushion pad, it becomes possible to suppress a seat appearance from being influenced by the bent portion when stuck outward from the edge of the groove side-end. According to an embodiment of the conveyance seat of the present disclosure, it becomes also possible to minimize an influence of a bent portion of an extending portion to a seat appearance. According to an embodiment of the conveyance seat of the present disclosure, a portion of a successive portion is sandwiched between an extending portion and a cushioning material, to thus alleviate a load applied to the successive portion when an occupant is seated on a conveyance seat, and it becomes also possible to suppress a disconnection of a leading line. According to an embodiment of the present disclosure, it is possible to secure an intake/exhaust function of a seating sensor, and to allow a stabilized operation of the seating sensor. According to an embodiment of the present disclosure, it is possible to stabilize intake of an outside air at an intake/exhaust port unit. According to an embodiment of the present disclosure, it is possible to inhibit a composition material of a first cushion member from coming in from an intake/exhaust port unit. According to an embodiment of the present disclosure, it is possible to protect a seating sensor. According to an embodiment of the present disclosure, it is possible to improve cushioning performance of a first cushion member. According to an embodiment of the present disclosure, it is possible to improve comfort of a conveyance seat.

BRIEF DESCRIPTION OF THE DRAWINGS

Various embodiments of invention are illustrated in the drawings, in which:

FIG. 3 is an exploded, perspective schematic of components of a conveyance seat according to one embodiment of the present disclosure;

FIG. 4 is a perspective schematic of a bottom wall;

FIG. 29 is a top view schematic of a resin frame, in a state of having a fore cushion member and a membrane switch built thereon;

DETAILED DESCRIPTION

First Embodiment

Hereinbelow, a conveyance seat according to one embodiment of the present disclosure (the present embodiment) is described. The embodiment described below is an example for facilitating understanding of the present disclosure and does not limit the present disclosure. That is to say, the present disclosure can be altered or improved without deviating from the gist thereof, and as a matter of course, the present disclosure includes equivalents thereof.

Hereinbelow, presenting an automatic two-wheeled vehicle V as an example of a conveyance, and a seat mounted on the automatic two-wheeled vehicle V (hereinbelow, seat for two-wheeled vehicle S) as an example of the conveyance seat of the present disclosure, a composition of a seat for the two-wheeled vehicle S is described. However, the present disclosure is also applicable to conveyance seats mounted on conveyances other than automatic two-wheeled vehicles, for example, automatic three-wheeled vehicles, four-wheeled vehicles such as automobiles, or ships or aircrafts.

In the description below, a "front to back direction" corresponds to the front to back direction of the seat for two-wheeled vehicle S, and coincides with a traveling direction of the automatic two-wheeled vehicle V. A "width direction" corresponds to the width direction (breadth direction) of the seat for two-wheeled vehicle S, and coincides with the right to left direction as one faces the automatic two-wheeled vehicle V. A "thickness direction" corresponds to a thickness direction of the seat for two-wheeled vehicle S, and is a direction orthogonal both to the front to back direction and the width direction. The thickness direction coincides with vertical direction when the automatic two-wheeled vehicle V stands perpendicularly on a level surface. Incidentally, each of the drawings (FIG. 1 to FIG. 13) which is referred to below shows the front to back direction, the width direction, and/or the thickness direction, as suitable, with an arrow.

Hereinbelow, when a position or a state of each part forming the seat for the two-wheeled vehicle S is described, a description is based on the automatic two-wheeled vehicle V being in a state of standing perpendicularly on a level surface (i.e., a state not tilted to the right or left), unless otherwise particularly specified.

Basic Composition of Seat for Two-Wheeled Vehicle According to the Embodiment

Figure 1:
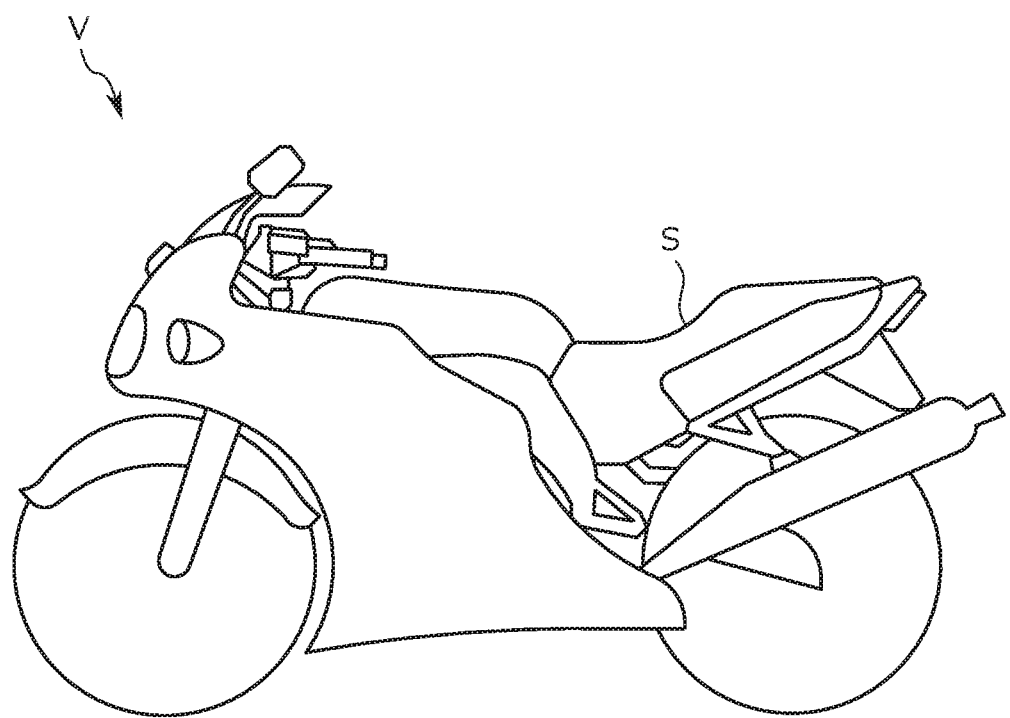
FIG. 1 is a side view schematic showing a conveyance on which the conveyance seat according to one embodiment of the present disclosure is mounted.
Figure 2A:
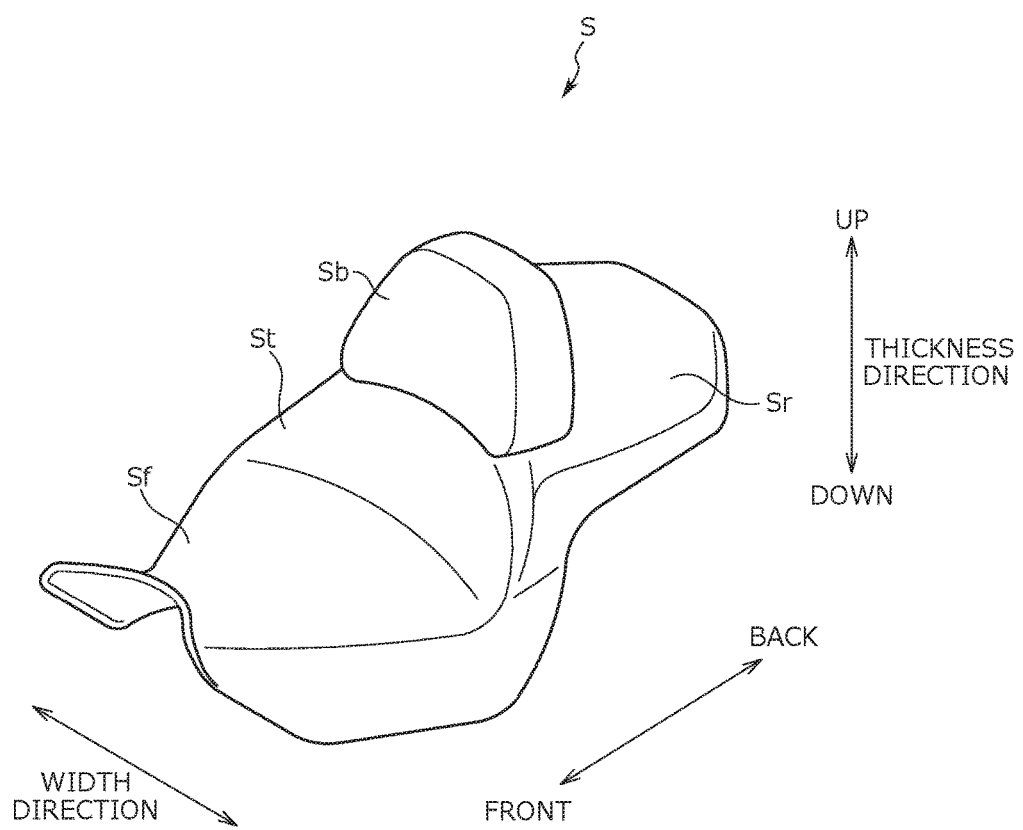
FIG. 2A is a perspective schematic showing a conveyance seat according to one embodiment of the present disclosure, in a state of having a backrest attached.
Figure 2B:
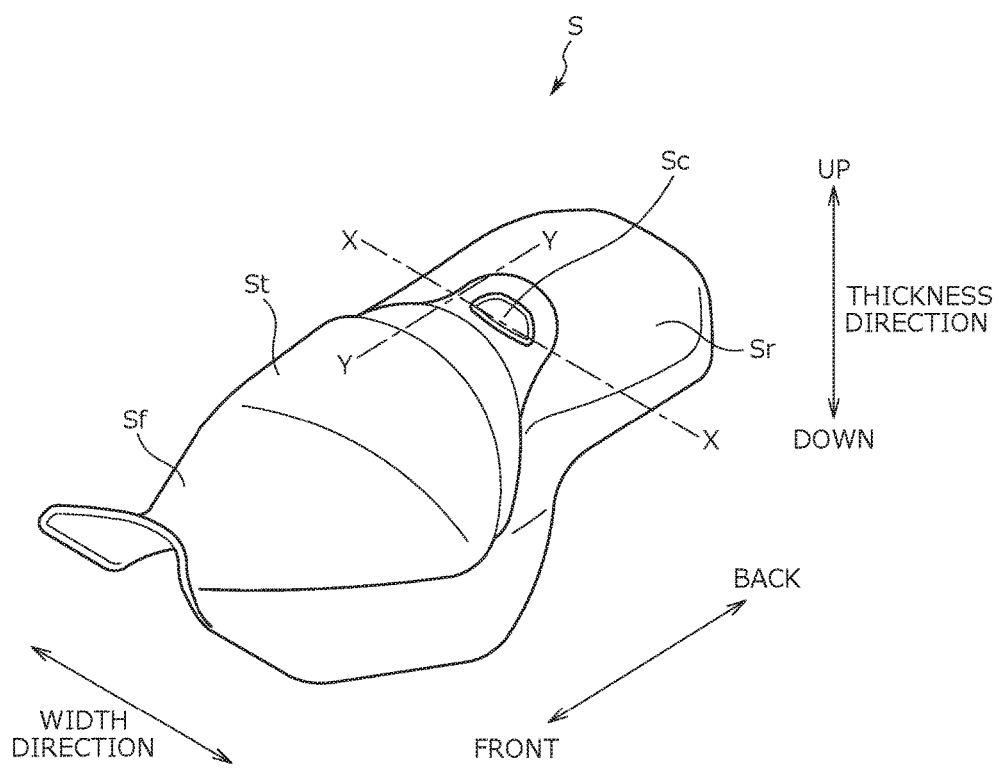
FIG. 2B is a perspective schematic showing a conveyance seat according to one embodiment of the present disclosure, in a state of having a backrest detached.

A basic composition of the seat for two-wheeled vehicle S according to the present embodiment (hereinbelow, simply referred to as seat for two-wheeled vehicle S) is described, with reference to FIG. 1 to FIG. 3. FIG. 1 is a side-view schematic of the automatic two-wheeled vehicle V, on which the seat for two-wheeled vehicle S is mounted. FIG. 2A is a perspective schematic showing the seat for two-wheeled vehicle S in a state of having a backrest Sb which is described below attached thereto. FIG. 2B is a perspective schematic showing the seat for two-wheeled vehicle S in a state of having the backrest Sb detached. FIG. 3 is an exploded, perspective schematic of components of the seat for two-wheeled vehicle S, when the seat for two-wheeled vehicle S is disassembled to each component parts.

The seat for two-wheeled vehicle S is a straddle-type seat, on which an occupant of the automatic two-wheeled vehicle V is seated by straddling it, which is mounted on the automatic two-wheeled vehicle V with being exposed outward, as illustrated in FIG. 1. That is to say, the seat for two-wheeled vehicle S is used in a state of being exposed to the outside air. In the present embodiment, the seat for two-wheeled vehicle S is a seat for two people, with a fore portion and a rear portion each configured to seat an occupant. That is to say, the fore portion of the seat for two-wheeled vehicle S is a fore seat Sf, and the rear portion of the same is a rear seat Sr.

In the seat for two-wheeled vehicle S, the rear seat Sr is in a position that is a level higher than the rear end of the fore seat Sf, as shown in FIG. 2B. More particularly, in the seat for two-wheeled vehicle S, a level difference St is provided between the fore seat Sf and the rear seat Sr. The level difference St is inclined relative to the front to back direction and the thickness direction, specifically, inclined to be positioned further upward towards the back.

In addition, as shown in FIG. 2A, in the seat for two-wheeled vehicle S, a fore end portion of the rear seat Sr has a backrest Sb. The backrest Sb supports the back of an occupant (namely, an occupant who is seated on the fore seat Sf) when only one occupant is seated on the fore seat Sf of the seat for two-wheeled vehicle S. The backrest Sb is arranged such that the fore face of the backrest Sb is generally continuous with the front face of the level difference St.

In addition, the backrest Sb is attachable to/detachable from the main body of the seat (the portion other than the backrest Sb of the seat for two-wheeled vehicle S). More particularly, the backrest Sb is attached to the main body of the seat in such a manner that a lower portion of the backrest Sb (specifically, a pillar which is not illustrated) is inserted into an insertion hole provided to a fore end portion of the rear seat Sr. Conversely, the backrest Sb is detached from the main body of the seat by pulling out the pillar of the backrest Sb from the insertion hole.

In a state where the backrest Sb is detached, the insertion hole is closed with a resin cover Sc in the fore end portion of the rear seat Sr, as shown in FIG. 2B.

The seat for two-wheeled vehicle S is configured by placing a cushion pad 20 on the upper face of a bottom plate 10 forming a bottom wall, and covering the cushion pad 20 with a covering R. In the present embodiment, a cushion pad 20 forming the fore seat Sf and a cushion pad 20 forming the rear seat Sr are separately provided. Each cushion pad 20 is configured by molding a cushioning material such as urethane into a predetermined shape. A thickness (a length in the thickness direction) of the cushion pad 20 is substantially the same as a thickness of a cushion pad used in a conventional seat for two-wheeled vehicle.

In addition, as shown in FIG. 3, the seat for two-wheeled vehicle S is equipped with an electric heater 30 as a temperature control unit, in addition to the aforementioned components (the bottom plate 10, the cushion pad 20 and the covering R). The electric heater 30 is used to heat the seat surface (specifically, a face which abuts buttocks of an occupant), and is arranged between the cushion pad 20 and the covering R. More particularly, the electric heater 30 is bonded to an upper end face of the cushion pad 20.

In the seat composition illustrated in FIG. 3, the fore seat Sf and the rear seat Sr are each provided with one electric heater 30. That is, the upper end face of the cushion pad 20 forming the fore seat Sf, and the upper end face of the cushion pad 20 forming the rear seat Sr are each provided with each one electric heater 30.

The electric heater 30 is operated by being supplied with electricity from a power source that is not illustrated. On/off of the electric heaters 30 is controlled by a controller which is not illustrated (specifically, an ECU (Electronic Control Unit)). This controller controls an operation time of (a time to turn on) each electric heater 30, according to a seat temperature. More specifically, a thermistor 40 as a temperature detection unit is arranged in the seat for two-wheeled vehicle S. The thermistor 40 is arranged between the cushion pad 20 and the bottom plate 10 in the thickness direction. During an operation of the electric heater 30, the thermistor 40 detects an ambient temperature (a temperature of the space in which the thermistor 40 is arranged, specifically, a temperature inside a housing cavity 21 which is described below) at the arranged position. The controller controls on/off of the electric heaters 30 according to temperatures detected by the thermistor 40.

The thermistor 40 outputs a signal according to a detected temperature, when temperature is detected. To the thermistor 40, a cable C forming the above-described transmission path is connected, as shown in FIG. 3. The cable C comes around to the backside of the bottom plate 10 through a through hole provided to the bottom plate 10, and is connected to a connection terminal (not illustrated) of the controller at the backside of the bottom plate 10. The controller receives an output signal from the thermistor 40 via the cable C.

Composition of Bottom Plate

A composition of the bottom plate 10 is described, with reference to FIG. 4. FIG. 4 is a perspective schematic of the bottom plate 10. The bottom plate 10 is a molded resin product which is molded into nearly a shape of a ship, and comprises a fore portion 11 forming the fore seat Sf, and a rear portion 12 forming the rear seat Sr. The rear portion 12 is positioned somewhat higher than the fore portion 11. That is to say, a level difference is formed between the fore portion 11 and the rear portion 12.

Specifically, as shown in FIG. 4, an inclined wall 13 forming the level difference St is provided between the fore portion 11 and the rear portion 12. The inclined wall 13 is inclined in the front to back direction and in the thickness direction, specifically, inclined to be positioned further upward towards the back. Here, the inclined wall 13 is an example of the protruding portion, which somewhat rises from the surrounding area (surrounding of the inclined wall 13, more specifically, a portion in the nearer position to the inclined wall 13 in the fore portion 11). In a state that a cushion pad 20 (specifically, the cushion pad 20 forming the rear seat Sr) is placed on the bottom plate 10, the inclined wall 13 protrudes toward the side in which the cushion pad 20 is positioned in the thickness direction, and is in contact with the bottom face (the back face) of the cushion pad 20.

As shown in FIG. 4, in a portion adjacent to the rear end of the inclined wall 13, in a center portion in the width direction of the rear portion 12, a convex portion for backrest attachment 14 protruding upward is formed. Here, the convex portion for backrest attachment 14 is an example of the protruding portion, which somewhat rises from the surrounding (surrounding of the convex portion for backrest attachment 14, for example, a portion in a side position of the convex portion for backrest attachment 14). In a state that a cushion pad 20 (specifically, the cushion pad 20 forming the rear seat Sr) is placed on the bottom plate 10, the convex portion for backrest attachment 14 protrudes toward the side in which the cushion pad 20 is positioned in the thickness direction, and is in contact with the bottom face (the back face) of the cushion pad 20.

The convex portion for backrest attachment 14 rises in a manner somewhat widening in the width direction, and is equipped with a hole extending downward from the top face of the convex portion for backrest attachment 14 (herein bellow, insertion hole 14a). The insertion hole 14a is a portion, into which a lower portion of the backrest Sb (specifically, a pillar portion) is inserted when the backrest Sb is attached. In a state that the backrest Sb is detached, an upper end opening of the insertion hole 14a is closed with the resin cover Sc.

In addition, as shown in FIG. 4, the both side end portions (the both end portions in the width direction) of the rear portion 12 has a lateral side standing wall 15 protruding upward. Here, the lateral side standing wall 15 is an example of the protruding portion, which somewhat rises from the surrounding (surrounding of the lateral side standing wall 15, specifically, a portion in the inner side in the width direction than the lateral side standing wall 15). In a state that a cushion pad 20 (specifically, the cushion pad 20 forming the rear seat Sr) is placed on the bottom plate 10, the lateral side standing wall 15 protrudes toward the side in which the cushion pad 20 is positioned in the thickness direction, and is in contact with the bottom face (the back face) of the cushion pad 20.

In addition, as shown in FIG. 4, an attachment unit 16 is provided to a portion positioned slightly closer to an outer side than a center portion in the width direction of a portion adjacent to the rear end of the inclined wall 13 in the rear portion 12 (namely, the fore end portion in the rear portion 12). The attachment unit 16 is a portion provided for placing a holding pad 50 thereon (which is described below), and attaching (fixing) the holding pad 50 thereto. That is to say, the portion provided with the attachment unit 16 in the rear portion 12 forms an attachment space for the holding pad 50. The upper face of the attachment unit 16 forms a flat face, in order to appropriately set the holding pad 50.

In addition, as shown in FIG. 4, around the attachment unit 16, the aforementioned protruding portions (namely, the inclined wall 13, the convex portion for backrest attachment 14 and the lateral side standing wall 15) are arranged. Specifically, the inclined wall 13 is provided to a position directly in front of the attachment unit 16. The convex portion for backrest attachment 14 is provided to a position adjacent to the attachment unit 16 closer to the inner side than the attachment unit 16 in the width direction. The lateral side standing wall 15 is provided to a position adjacent to the attachment unit 16 closer to the outer side than the attachment unit 16 in the width direction.

Composition of Cushion Pad

Figure 5:
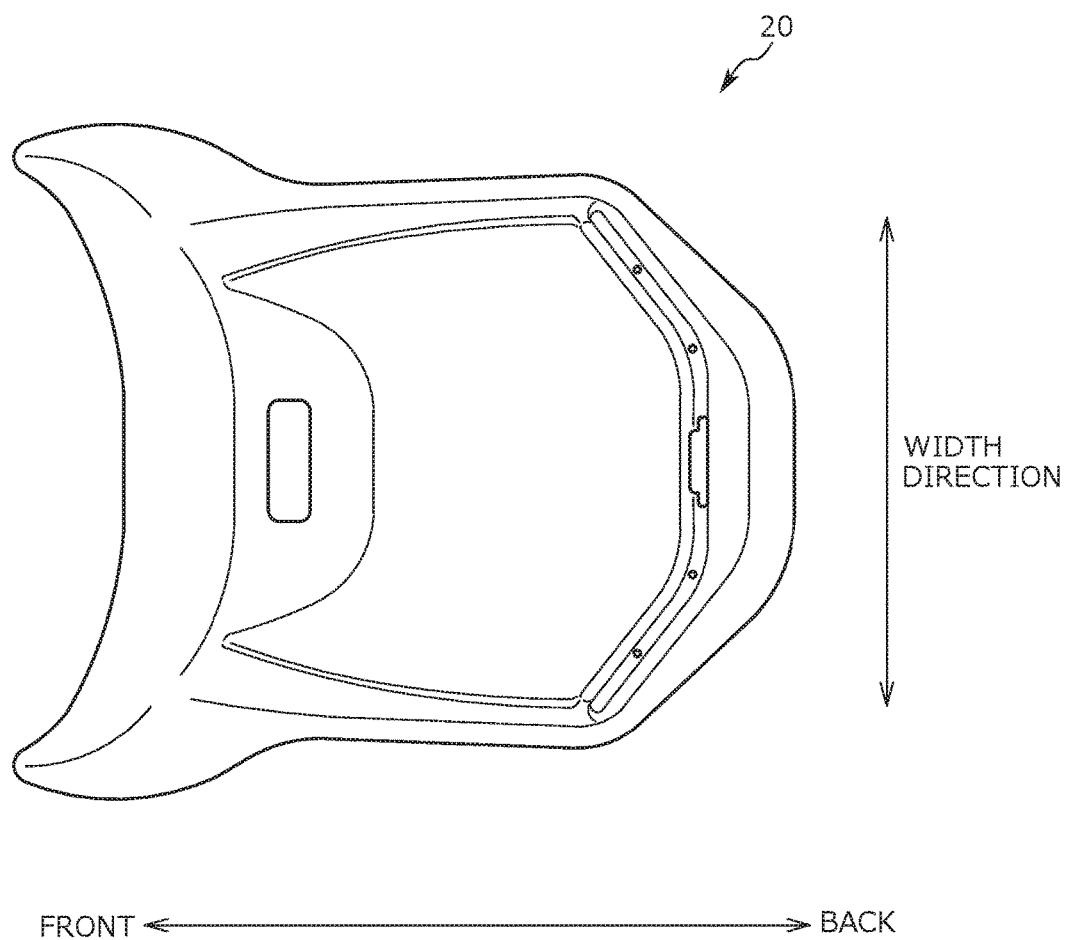
FIG. 5 is a schematic of a cushion pad, viewed from above.
Figure 6:
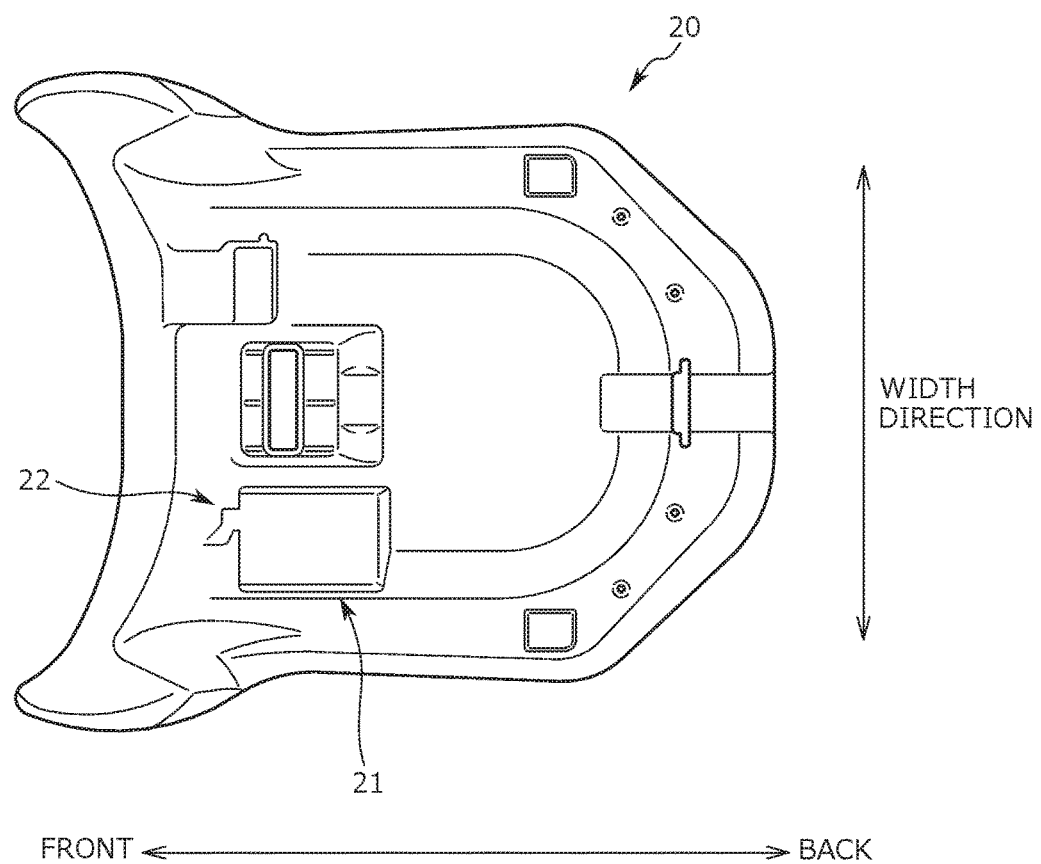
FIG. 6 is a schematic of a cushion pad, viewed from below.
Figure 7:
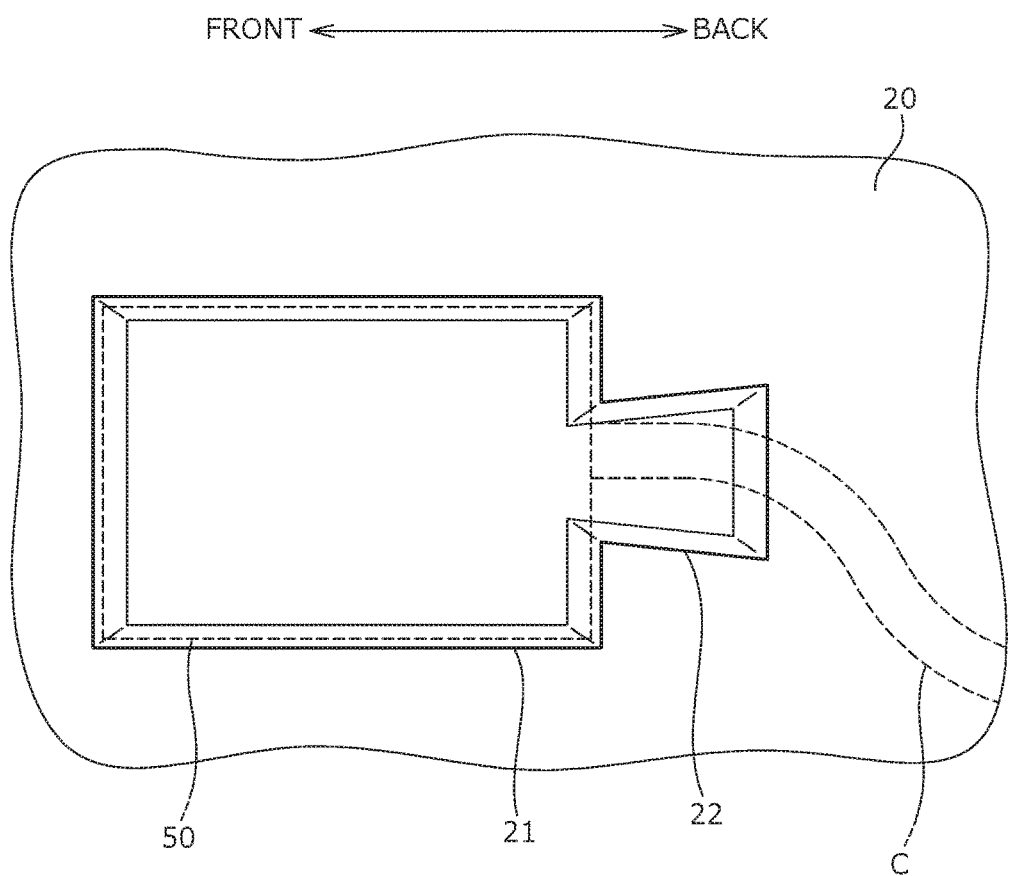
FIG. 7 is an enlarged schematic showing a housing cavity area of a bottom face of a cushion pad, viewed from below.

Next, a composition of the cushion pad 20, in particular, the cushion pad 20 that forms the rear seat Sr is described, with reference to FIG. 5 to FIG. 7. FIG. 5 is a schematic of the cushion pad 20, viewed from above. FIG. 6 is a schematic of the cushion pad 20, viewed from below. FIG. 7 is an enlarged schematic showing an area of a housing cavity 21 that is described below, of the bottom face of the cushion pad 20. In FIG. 7, the holding pad 50 and the cable C are illustrated with broken lines, in order to show a positional relationship of the housing cavity 21 and the holding pad 50 or the cable C.

In the description below, the cushion pad 20 forming the rear seat Sr is simply referred to as "cushion pad 20", unless otherwise particularly specified.

The cushion pad 20 according to the present embodiment comprises a comparatively high density urethane pad, and has an outer shape as illustrated in FIG. 5 and FIG. 6. An electric heater 30 is bonded to the upper face (the face which supports an occupant in the thickness direction) of the cushion pad 20. More specifically, the electric heater 30 comprises a substrate 31 comprising a mat made of rubber (specifically, ethylene propylene diene rubber) and a heater line which is not illustrated bonded to the lower face of the substrate 31. The electric heater 30 is attached (bonded) to the upper face of the cushion pad 20, in such a state that the heater line faces the upper face of the cushion pad 20.

Although the mat forming the substrate 31 comprises a closed foam material in the present embodiment, the mat is not limited thereto, and may comprise an open foam material.

In addition, on the lower face in the bottom portion of the cushion pad 20 (namely, a portion facing the bottom plate 10 in the thickness direction), a housing cavity 21 with a hollowed shape is formed, as shown in FIG. 6. The housing cavity 21 corresponds to the housing unit, and is a concave portion with a rectangular shape in a plan view, formed by being somewhat hollowed from the surrounding (surrounding of the housing cavity 21) in the thickness direction.

The housing cavity 21 is provided to the lower face of the cushion pad 20, slightly outside from the center in the width direction, as shown in FIG. 6. More particularly, in a state that the cushion pad 20 is placed on the rear portion 12 of the bottom plate 10, the housing cavity 21 is positioned directly above the attachment unit 16.

In addition, as shown in FIG. 7, a cable housing cavity 22 that is generally continuous with the housing cavity 21 is formed on a portion adjacent to the housing cavity 21 in the bottom portion of the cushion pad 20. The cable housing cavity 22 is a cavity portion with a hollowed shape, and a portion of the cable C that forms a transmission path for an output signal from the thermistor 40 comes into the cable housing cavity 22. By making a portion of the cable C come into the cable housing cavity 22, it becomes possible to route the cable C appropriately on the lower face of the bottom portion of the cushion pad 20. In the present embodiment, the size (cross sectional size) of the cable housing cavity 22 is somewhat large compared to the cross section of the cable C, allowing the cable C to smoothly come into the cable housing cavity 22.

Arrangement Position of Thermistor

Figure 8:
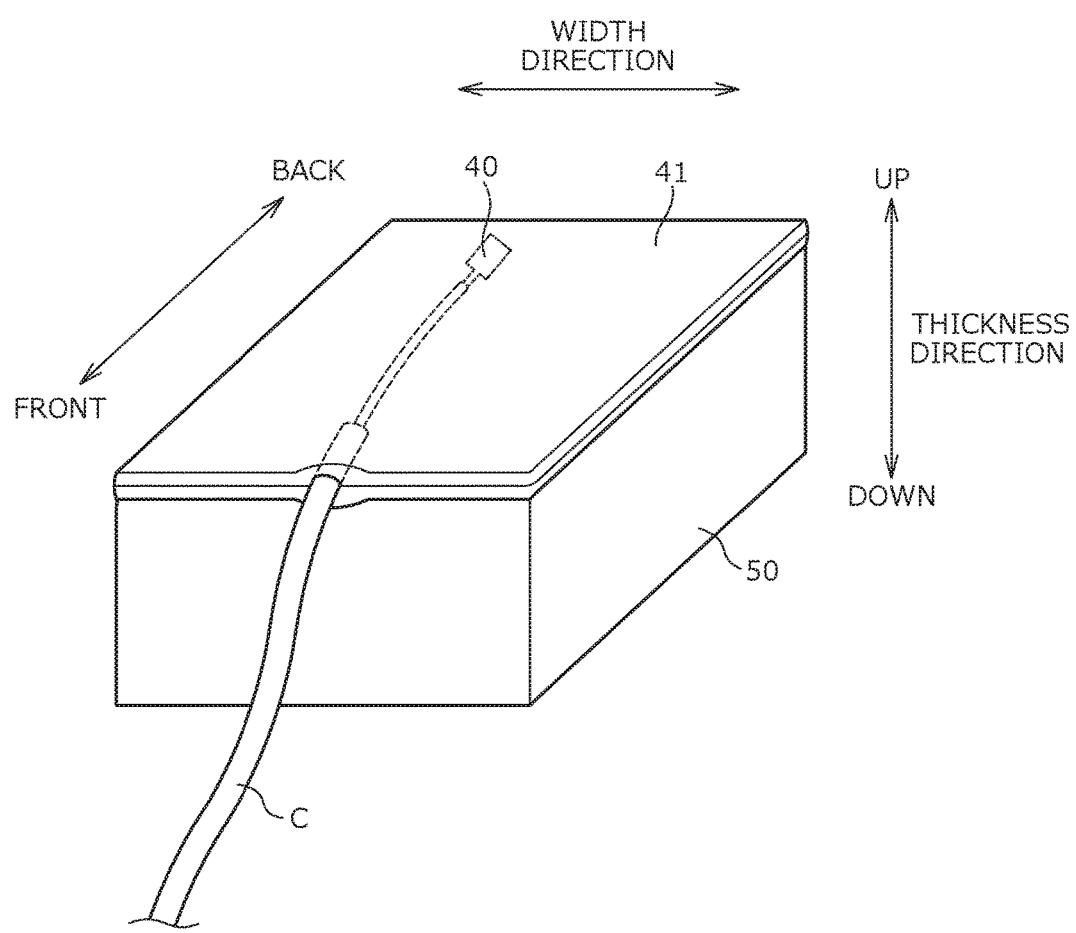
FIG. 8 is a perspective schematic showing a holding unit.
Figure 9:
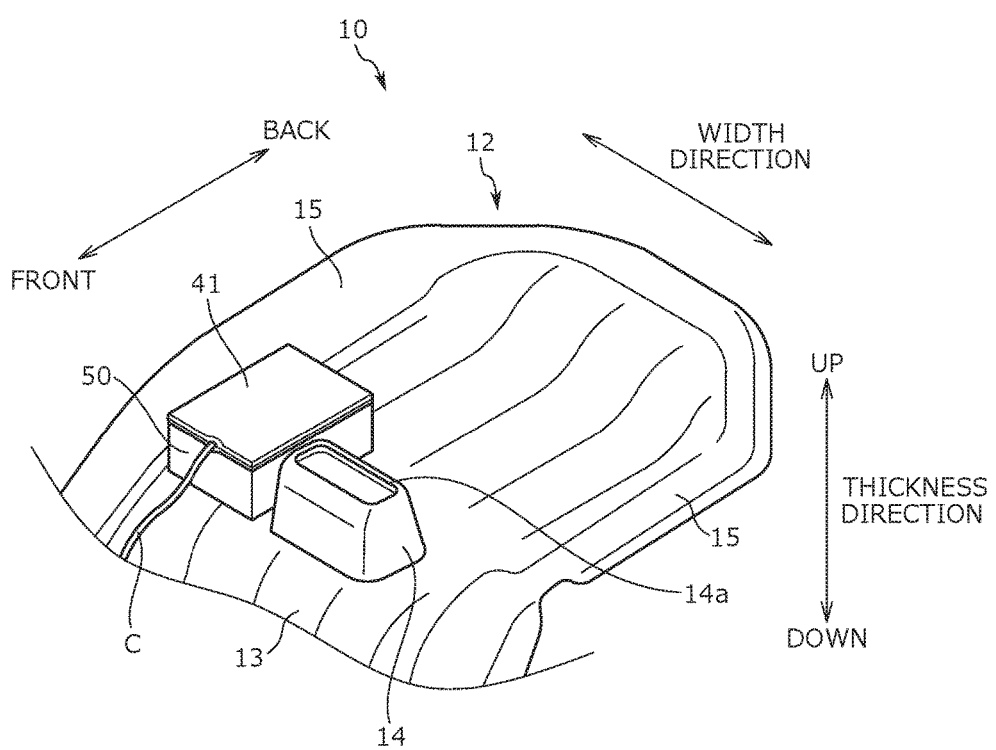
FIG. 9 is a perspective schematic showing an arranged position of a holding unit.
Figure 10:
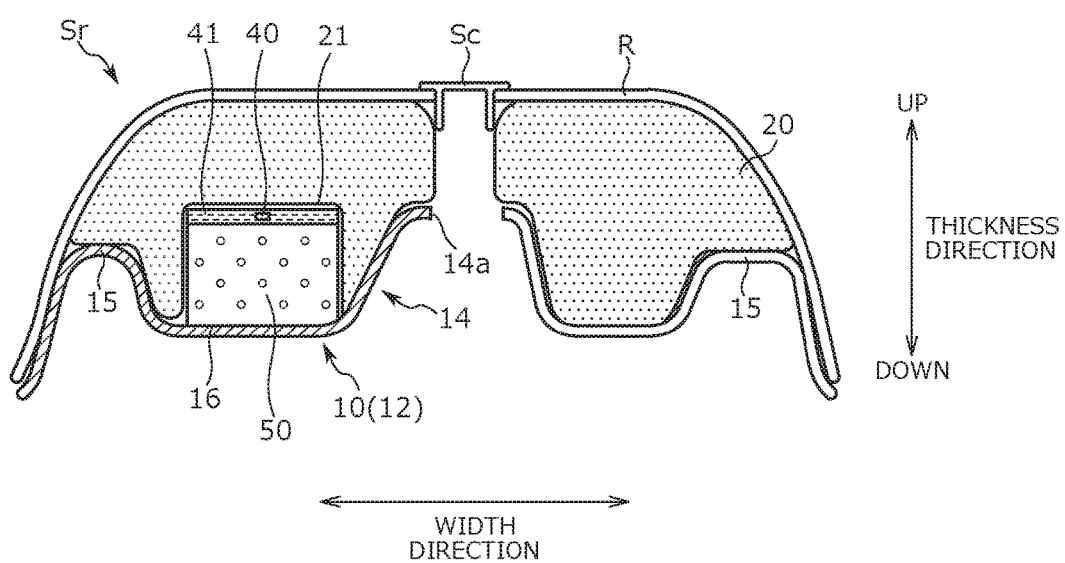
FIG. 10 is a cross-sectional schematic showing the X-X cross section of FIG. 2B.
Figure 11:
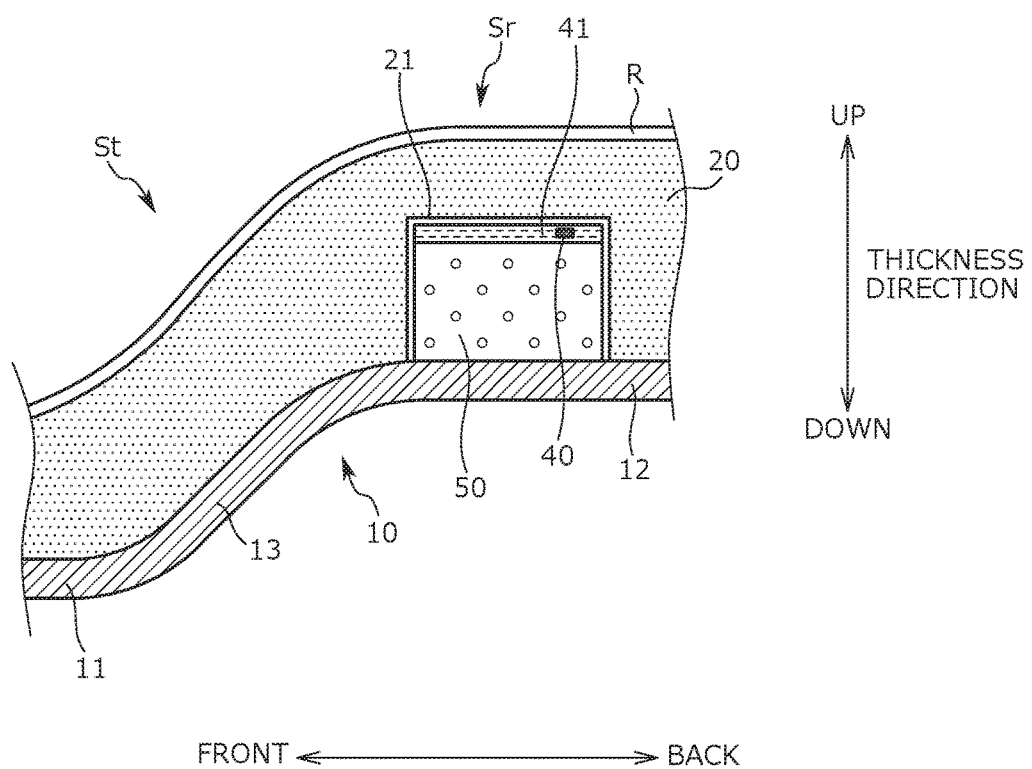
FIG. 11 is a cross-sectional schematic showing the Y-Y cross section of FIG. 2B.

Arrangement position of the thermistor 40 in the present embodiment is described, with referring to FIG. 8 to FIG. 11. FIG. 8 is a perspective schematic showing a holding pad 50 that is described below. FIG. 9 is a perspective schematic of an arrangement position of the holding pad 50, which is a plan showing the rear portion 12 of the bottom plate 10, with the holding pad 50 placed thereon. FIG. 10 is a cross-sectional schematic showing the X-X section of FIG. 2B. FIG. 11 is a cross-sectional schematic showing the Y-Y section of FIG. 2B.

In the present embodiment, the thermistor 40 is arranged inside the housing cavity 21 that is formed on the bottom portion of the cushion pad 20. The present embodiment is configured to suppress a positional deviation in the housing cavity 21, of the thermistor 40. Specifically, in order to hold the thermistor 40 within the housing cavity 21, the holding pad 50 which is illustrated in FIG. 8 is used.

The holding pad 50 is a holding unit configured to hold the thermistor 40 within the housing cavity 21, and comprises a cushioning material in a substantially rectangular-parallelepiped shape. As a cushioning material to form the holding pad 50, it is possible to use a material which is softer and richer in flexibility than a material of the bottom plate 10, and further has a thermal-insulating property, for example, an urethane foam, or the like.

The holding pad 50 has a slight thickness, specifically, a thickness substantially the same as a depth of the housing cavity 21. More specifically, a height of the holding pad 50 with a nonwoven fabric 41 that is described below overlapped thereon substantially coincides with a depth (height) of the housing cavity 21. An outer shape of the holding pad 50 is a shape fittable to the housing cavity 21.

The holding pad 50 further has the thermistor 40 attached on the upper face thereof, as shown in FIG. 8. In the present embodiment, the thermistor 40 is attached to the holding pad 50 in such a state that the thermistor 40 is wrapped with the nonwoven fabric 41 as a cushioning material. Specifically, seats made of nonwoven fabric 41 are arranged on upper and lower sides of the thermistor 40, and the thermistor 40 is in a state of being sandwiched between the nonwoven fabric 41. In the nonwoven fabric 41, the portion positioned in the upper side of the thermistor 40 and the portion positioned in the lower side of the thermistor 40 are both cut into a shape identical to the shape of the upper face of the holding pad 50. Then, the portion positioned in the upper side of the thermistor 40 and the portion positioned in the lower side of the thermistor 40 of the nonwoven fabric 41 are bonded to each other, and the nonwoven fabric 41 positioned in the lower side of the thermistor 40 is further adhered to the upper face of the holding pad 50.

The holding pad 50 to which the thermistor 40 is attached is fixed onto the attachment unit 16 which is provided to the upper face of the bottom plate 10, as shown in FIG. 9. Then, as the cushion pad 20 is placed on the rear portion 12 of the bottom plate 10, the holding pad 50 comes into the housing cavity 21 which is formed in the bottom portion of the cushion pad 20, to be fit in the housing cavity 21. As a result, the holding pad 50 holds the thermistor 40 within the housing cavity 21.

In the above manner, the holding pad 50 holds the thermistor 40 within the housing cavity 21, by being fit in the housing cavity 21 and having the thermistor 40 attached thereto. In other words, the thermistor 40 is held by the holding pad 50, and positioned between the cushion pad 20 and the holding pad 50, within the housing cavity 21, as shown in FIG. 10. Specifically, in the housing cavity 21, the nonwoven fabric 41 wrapping the thermistor 40 is sandwiched with the holding pad 50 and the cushion pad 20 in the thickness direction.

By the above composition, it becomes possible in the present embodiment, to stabilize a position of the thermistor 40 within the housing cavity 21. Moreover, since the thermistor 40 is sandwiched between the cushion pad 20 and the holding pad 50, it is possible to effectively suppress the thermistor 40 from being damaged due to a load (sitting load) applied to the thermistor 40, when an occupant is seated on the seat for two-wheeled vehicle S. Furthermore, since the thermistor 40 is wrapped with the nonwoven fabric 41, it becomes possible to protect the thermistor 40 more desirably.

An inner wall of the housing cavity 21 comprises a comparatively high density material (specifically, an urethane pad). The holding pad 50 comprises a cushion material having a thermal-insulating property (specifically, an urethane foam). Therefore, the space inside the housing cavity 21 shall be hard to crush, and at the same time, effectively thermally insulated. This allows the thermistor 40 to accurately detect a temperature, in the housing cavity 21.

In addition, as shown in FIG. 7, a cable housing cavity 22 is formed on a portion adjacent to the housing cavity 21 in the bottom portion of the cushion pad 20. In the cable C forming a transmission path of an output signal from the thermistor 40, a portion coming outside of the housing cavity 21 from an end of the housing cavity 21 comes into the cable housing cavity 22.

In the present embodiment, the surrounding of the holding pad 50 is further provided with a means for suppressing the holding pad 50 from being deformed or positionally deviated due to a load applied to the cushion pad 20 at a sitting on the seat. Specifically, as shown in FIG. 10 and FIG. 11, in the bottom plate 10, the inclined wall 13, the convex portion for backrest attachment 14, and the lateral side standing walls 15, as protruding portions are provided in positions adjacent to the attachment unit 16 on which the holding pad 50 is placed (in other words, positions adjacent to the holding pad 50).

The inclined wall 13 protrudes upwardly (namely, toward the side in which the cushion pad 20 is positioned in the thickness direction) from the rear end of the fore portion 11 of the bottom plate 10, and at the same time, the inclined wall 13 is provided forward of the holding pad 50 in the front to back direction, as shown in FIG. 11. That is to say, the inclined wall 13 corresponds to the fore wall. By providing this inclined wall 13, even if a load is applied when a back of an occupant who is seated on the seat for two-wheeled vehicle S leans on the level difference St (hereinbelow, a load from the front), it becomes possible to receive the load from the front with the inclined wall 13, at a position forward of the holding pad 50. As a result, it becomes possible to suppress the holding pad 50 from being deformed or moved by a load from the front, to thereby stabilize a position of the thermistor 40.

The convex portion for backrest attachment 14 is an example of the protruding portion, which protrudes upwardly (namely, toward the side in which the cushion pad 20 is positioned in the thickness direction) from a center portion in the width direction of the rear portion 12 of the bottom plate 10, as shown in FIG. 10. The convex portion for backrest attachment 14 is provided to a position adjacent to the holding pad 50 in the width direction. A height of the convex portion for backrest attachment 14 (in other words, a size of protrusion of the convex portion for backrest attachment 14) is longer than a height of the holding pad 50 (specifically, a distance from the attachment unit 16 to the thermistor 40 in the thickness direction). By providing such a convex portion for backrest attachment 14, even if a load is applied when an occupant is seated on the rear seat Sr of the seat for two-wheeled vehicle S, it becomes possible to receive the load from above with the convex portion for backrest attachment 14, at a position above the holding pad 50. As a result, it becomes possible to suppress the holding pad 50 from being deformed or moved by a load from above, to thereby stabilize a position of the thermistor 40.

The lateral side standing wall 15 protrudes upwardly (namely, toward the side in which the cushion pad 20 is positioned in the thickness direction) at a lateral side portion in the rear portion 12 of the bottom plate 10. The lateral side standing wall 15 is positioned closer to an outer side than the holding pad 50 in the width direction. That is to say, the lateral side standing wall 15 corresponds to the lateral wall. The lateral side standing wall 15 is provided in a pair, to the right and left, and one of the lateral side standing walls 15, positioned in the side opposite to the convex portion for backrest attachment 14 when view from the holding pad 50, is arranged to a position adjacent to the holding pad 50 in the width direction, as shown in FIG. 10. By providing such a lateral side standing wall 15, even if a load is applied when, for example, an occupant who is seated on the rear seat Sr of the seat for two-wheeled vehicle S leans right or left (hereinbelow, a load from a lateral side), a lateral side standing wall 15 positioned in an end portion in the outer side in the width direction is made to receive the load from a lateral side. As a result, it becomes possible to suppress the holding pad 50 from being deformed or moved by a load from a lateral side, to thereby stabilize a position of the thermistor 40.

Figure 12:
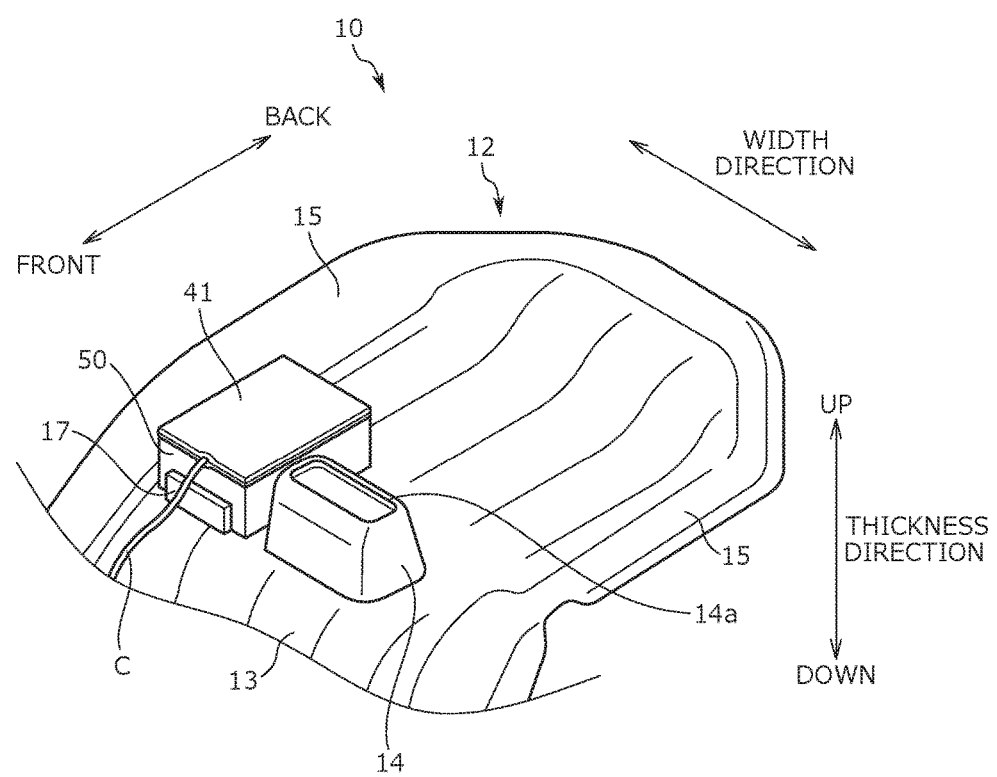
FIG. 12 is a perspective schematic showing a composition when a bottom wall has a positioning rib.

As a supplement to the composition around the holding pad 50 in the bottom plate 10, for example, as shown in FIG. 11, a positioning rib 17 with a convex shape may be provided to a position directly in front of the site to which the holding pad 50 is attached, in the attachment unit 16. FIG. 12 is a perspective schematic showing a composition when the bottom plate 10 has the positioning rib 17, which is a variation of the composition illustrated in FIG. 9. When the holding pad 50 is placed on the attachment unit 16 and fixed thereto, if the positioning rib 17 is provided, it becomes possible to position and appropriately fix the holding pad 50.

Other Embodiments

Figure 13:
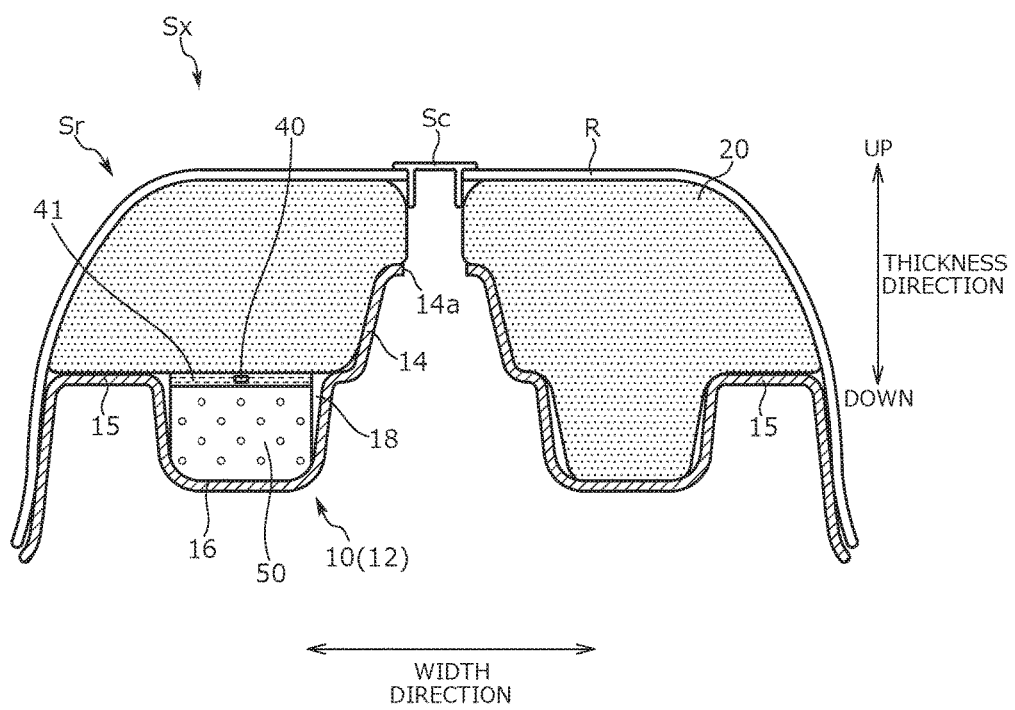
FIG. 13 is a cross-sectional schematic showing a composition of a conveyance seat according to a variation.

So far, a composition of the conveyance seat of the present disclosure has been described by giving an example. However, the present disclosure is not limited to the embodiment, but includes other embodiments. For example, in the above embodiment, the housing cavity 21 as a housing unit is formed in a bottom portion of the cushion pad 20 (a portion facing the bottom plate 10 in the thickness direction). However, the composition is not limited thereto, but may be such that a portion of the upper end portion of the bottom plate 10 (namely, a portion facing the cushion pad 20 in the thickness direction) is hollowed downward, to thereby provide a housing cavity 18 as a housing unit to the bottom plate 10, as shown in FIG. 13. FIG. 13 is a cross-sectional schematic showing a composition of a seat for two-wheeled vehicle Sx according to the variation, and is a plan showing a cross section corresponding to the X-X cross section of FIG. 2B.

In the seat for two-wheeled vehicle Sx according to the variation, the attachment unit 16 is provided to a face positioned in the deepest portion of the housing cavity 18, as shown in FIG. 13. Then, as shown in FIG. 13, the holding pad 50 with the thermistor 40 attached thereto comes into the housing cavity 18 from the upper end opening of the housing cavity 18, and the holding pad 50 is fit in the housing cavity 18. In this manner, the thermistor 40 is held within the housing cavity 18.

When the cushion pad 20 is placed on the rear portion 12 of the bottom plate 10 in the above state, the thermistor 40 is held and positioned between the cushion pad 20 and the holding pad 50 within the housing cavity 18. The above composition stabilizes a position of the thermistor 40 within the housing cavity 18, similarly as in the seat for two-wheeled vehicle S described in the above described embodiment.

Second Embodiment

Hereinbelow, a conveyance seat according to one embodiment (the second embodiment) of the present disclosure is described. The embodiment described below is an example for facilitating understanding of the present disclosure and does not limit the present disclosure. That is to say, the present disclosure can be altered or improved without deviating from the gist thereof, and as a matter of course, the present disclosure includes equivalents thereof.

Hereinbelow, presenting a seat for automatic two-wheeled vehicle (hereinbelow, seat for two-wheeled vehicle 100) as an example of the conveyance seat, a composition thereof is described. However, the present disclosure is also applicable to a conveyance seat mounted on a conveyance other than automatic two-wheeled vehicles, for example, an automatic three-wheeled vehicle, a four-wheeled vehicle such as an automobile, a ship or an aircraft.

In the description below, a "front to back direction" corresponds to the front to back direction of the seat for two-wheeled vehicle 100, and coincides with a traveling direction of the automatic two-wheeled vehicle. A "width direction" corresponds to the width direction (breadth direction) of the seat for two-wheeled vehicle 100, and coincides with the right to left direction as one faces the automatic two-wheeled vehicle. A "thickness direction" corresponds to a thickness direction of a cushion pad 110 which is described below, and is a direction orthogonal both to the front to back direction and the width direction. Each of the drawings (FIG. 14 to FIG. 23) that is referred to below shows the front to back direction, the width direction, and/or the thickness direction, which is suitable to be illustrated, with an arrow.

In addition, hereinbelow, when a position of each part forming the seat for two-wheeled vehicle 100 is described, a position of the automatic two-wheeled vehicle in a state of standing perpendicularly on a level surface (a state not tilted to the right or left) is described, unless otherwise particularly specified.

<<Basic Composition of Seat for Two-Wheeled Vehicle According to the Embodiment>>

Figure 14:
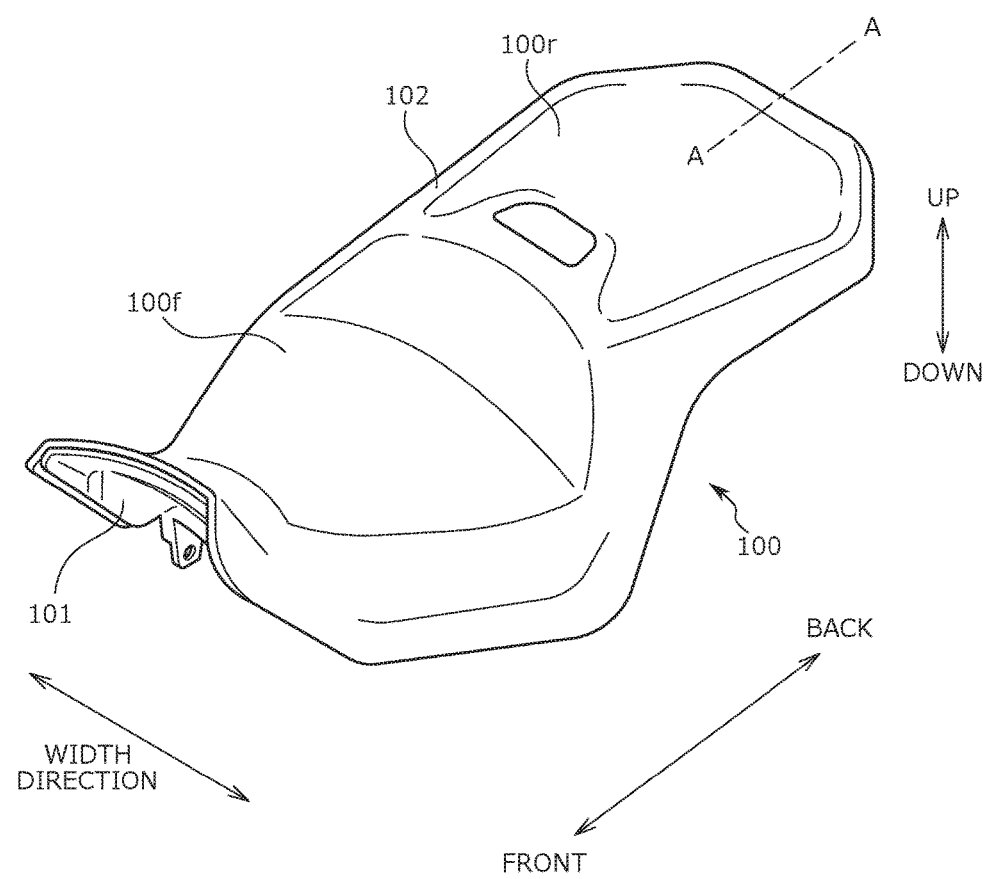
FIG. 14 is a perspective schematic of a conveyance seat according to one embodiment of the present disclosure.
Figure 15:
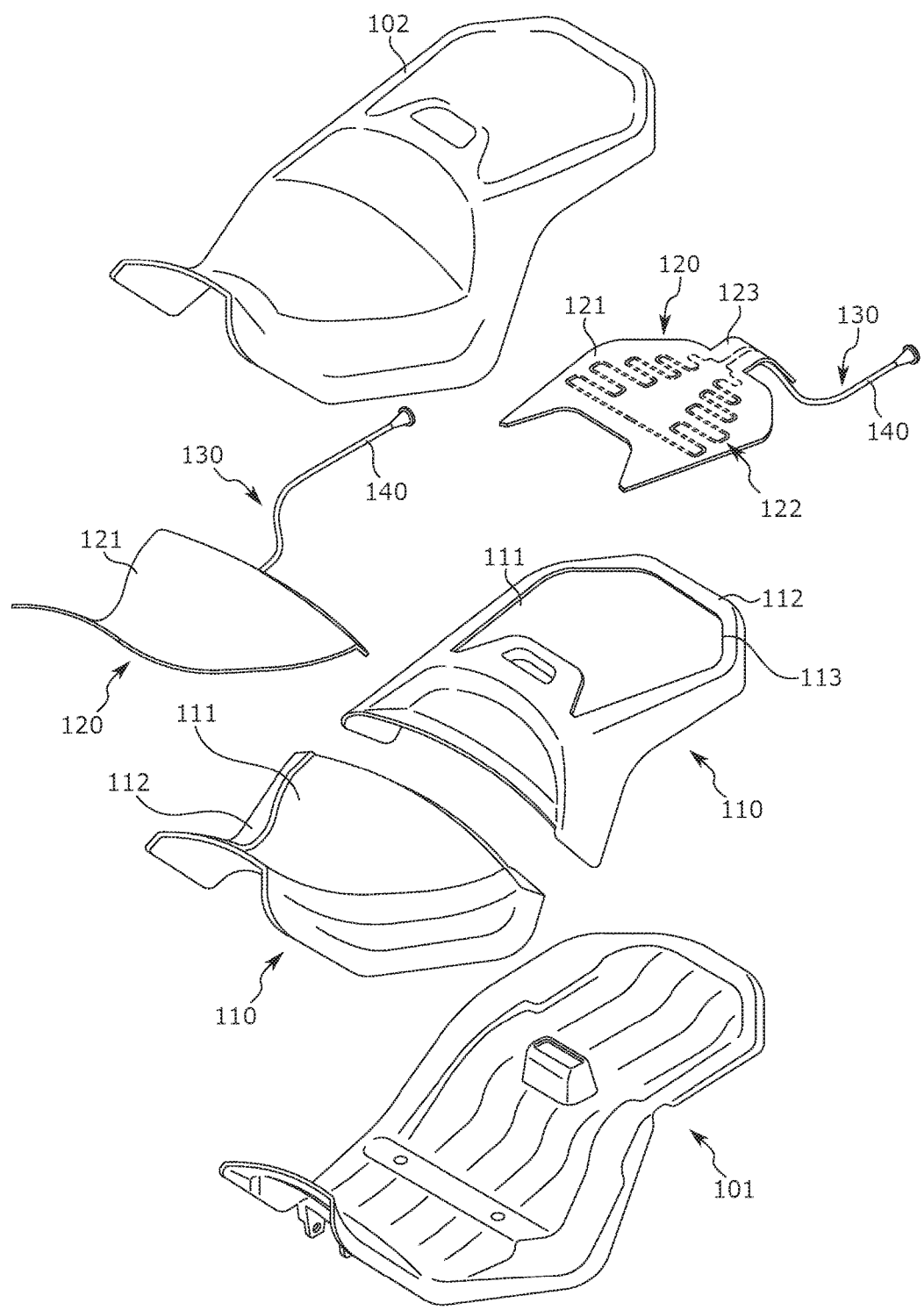
FIG. 15 is an exploded perspective schematic of components of a conveyance seat according to one embodiment of the present disclosure.
Figure 16:
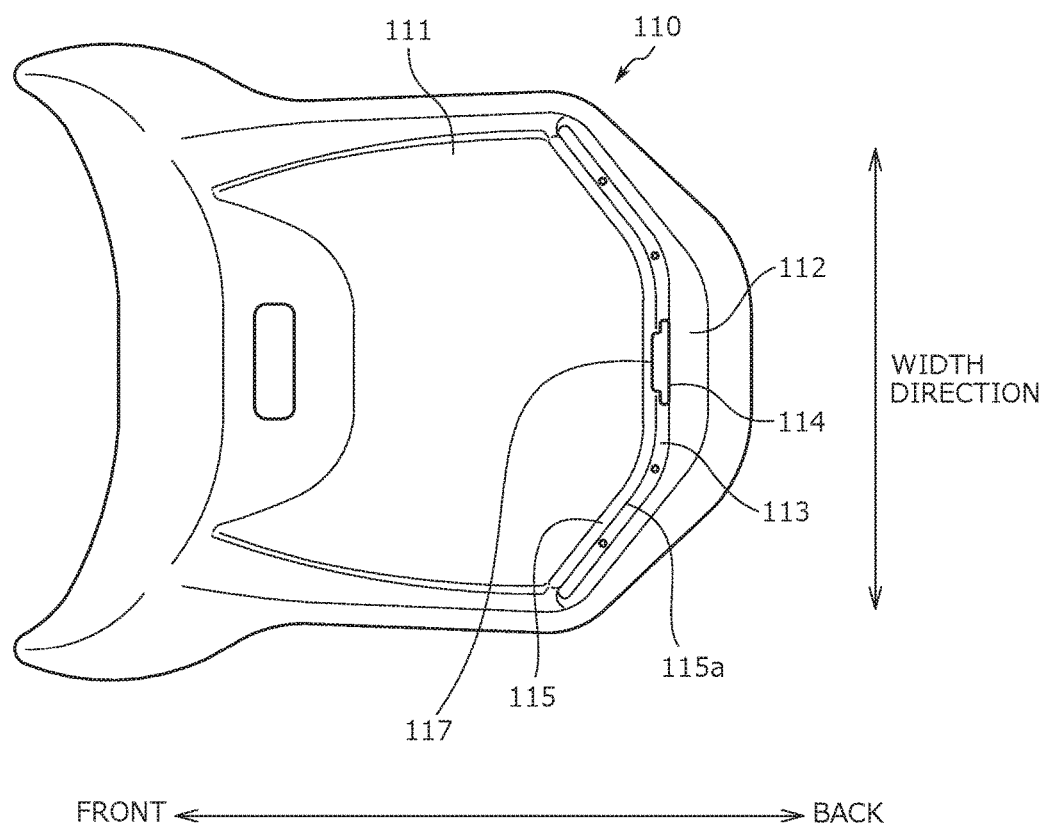
FIG. 16 is a schematic of a cushion pad, viewed from above.
Figure 17:
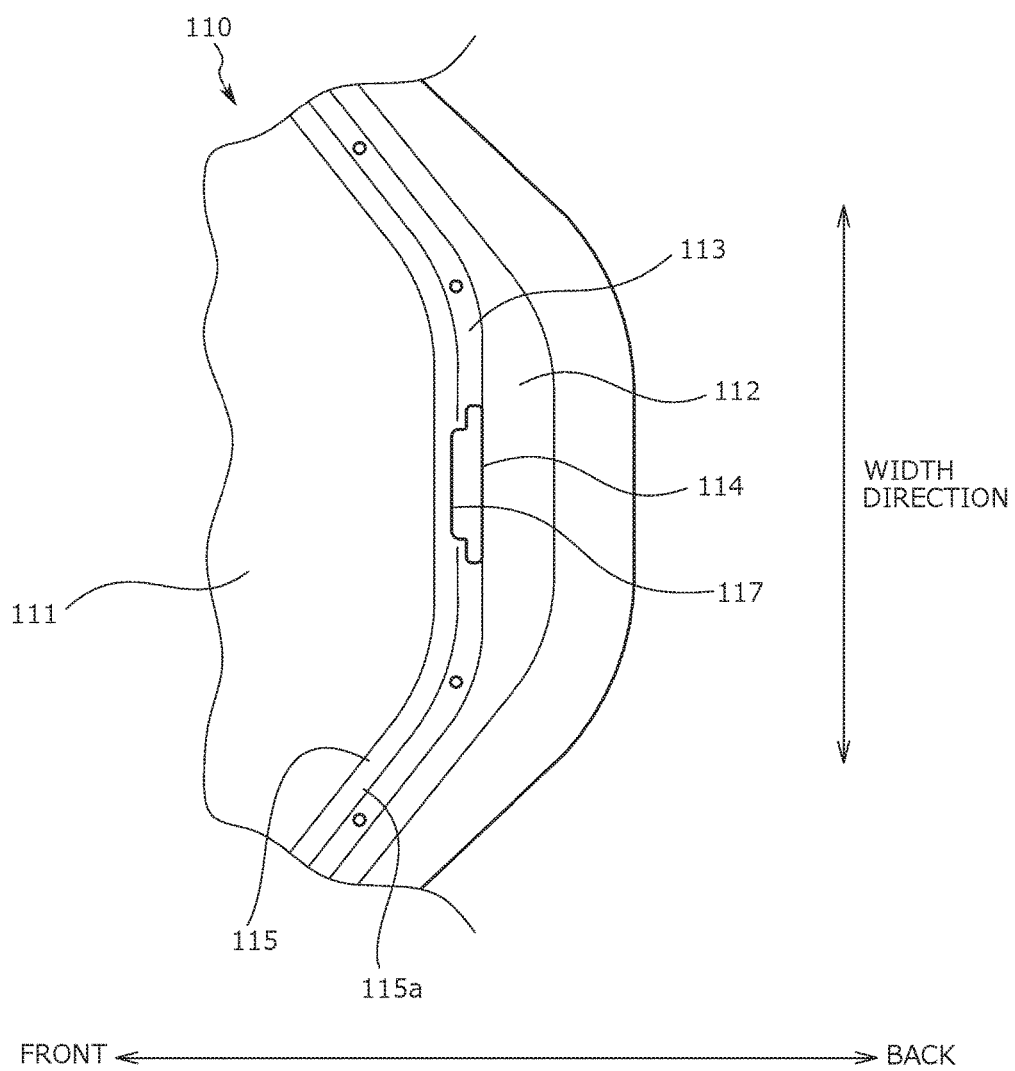
FIG. 17 is an enlarged schematic of one end portion of a cushion pad.
Figure 18:
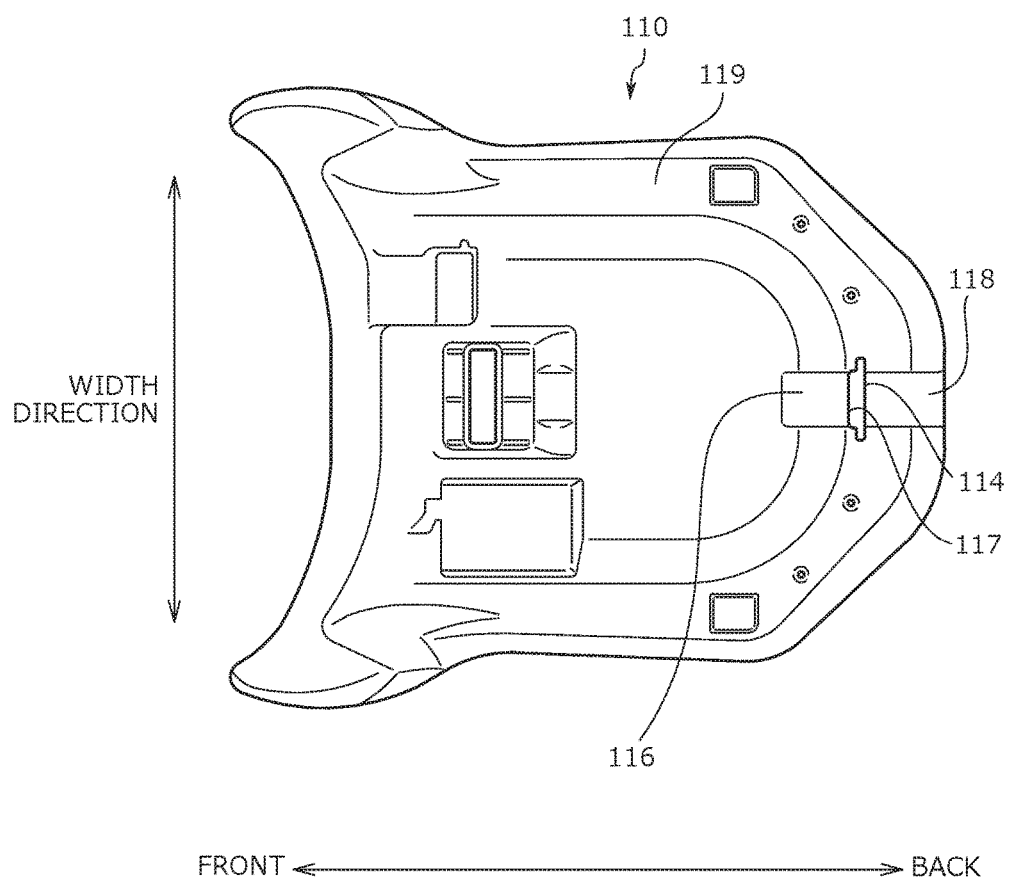
FIG. 18 is a schematic of a cushion pad, viewed from below.
Figure 19:
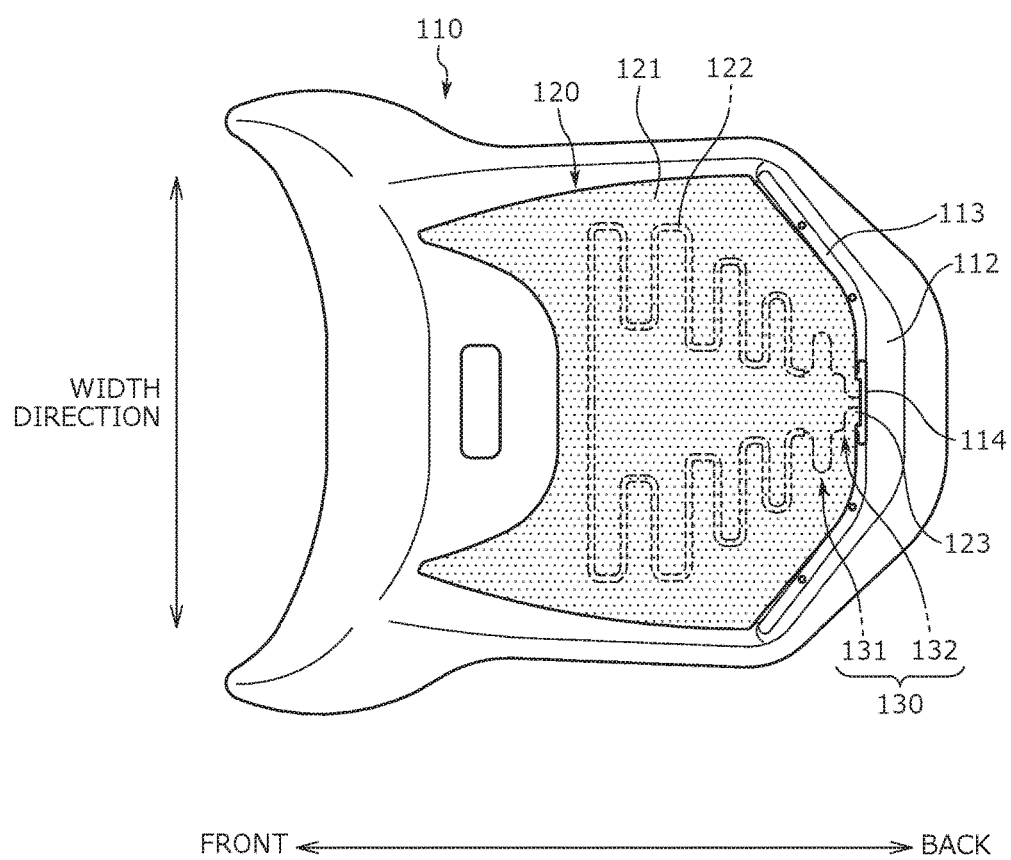
FIG. 19 is a schematic of a cushion pad with an electric heater attached thereto, viewed from above.

A basic composition of the seat for two-wheeled vehicle 100 according to the present embodiment is described, with referring to FIG. 14 to FIG. 19. FIG. 14 is a perspective schematic of the seat for two-wheeled vehicle 100 according to the present embodiment. FIG. 15 is an exploded perspective schematic of components of the seat for two-wheeled vehicle 100 according to the present embodiment, when the seat for two-wheeled vehicle 100 is disassembled to each component parts. FIG. 16 is a schematic of the cushion pad 110 forming the rear seat 100r which is described below, viewed from above. FIG. 17 is an enlarged schematic of the rear end portion of the cushion pad 110 forming the rear seat 100r. FIG. 18 is a schematic of the cushion pad 110 forming the rear seat 100r, viewed from below. FIG. 19 is a schematic of the cushion pad 110 with an electric heater 120 which is described below attached thereto, viewed from above.

The seat for two-wheeled vehicle 100 is a straddle-type seat, on which an occupant of an automatic two-wheeled vehicle is seated by straddling it, which is mounted on an automatic two-wheeled vehicle, in a state exposed outward. The seat for two-wheeled vehicle 100 according to the present embodiment is a seat for two people, with a fore portion and a rear portion capable of seating each occupant, as shown in FIG. 14. That is to say, the fore portion of the seat for two-wheeled vehicle 100 constitutes a fore seat 100f, and the rear portion constitutes a rear seat 100r. In the seat for two-wheeled vehicle 100, the rear seat 100r rises from the rear end of the fore seat 100f to be in a position a level higher.

The seat for two-wheeled vehicle 100 is configured as shown in FIG. 15, by placing the cushion pad 110 on an upper face of a bottom plate 101 forming a bottom wall, and covering the cushion pad 110 with a covering 102. In the present embodiment, a cushion pad 110 forming the fore seat 100f, and a cushion pad 110 forming the rear seat 100r are separately provided. Each cushion pad 110 is configured by molding a cushioning material such as urethane into a predetermined shape. A thickness (length in the thickness direction) of the cushion pad 110 is substantially the same as a thickness of a cushion pad used in a conventional seat for two-wheeled vehicle.

Each cushion pad 110 is equipped with a supporting face 111 that supports an occupant on the upper face thereof, as shown in FIG. 15. A peripheral portion of each cushion pad 110 has a bank portion 112 that rises somewhat upward from the surrounding. More specifically, in the cushion pad 110 forming the rear seat 100r, the bank portions 112 are provided to end portions in the both sides (end portions in the width direction) and to the rear end portion, as shown in FIG. 16. In the cushion pad 110 forming the fore seat 100f, bank portions 112 are provided to end portions in the both sides, and to the fore end portion.

In the cushion pad 110, a site adjacent to the bank portion 112 has a groove for slinging an end portion of the covering 102 (hereinbelow, a sling groove 113). Specifically, the cushion pad 110 forming the rear seat 100r has the sling groove 113, at a position adjacent to the bank portion 112, in the fore side of the bank portion 112 provided to the rear end portion, as shown in FIG. 16. The sling groove 113 extends over a comparatively long distance, and curves in a bow shape along the rear end portion of the cushion pad 110, from an area of one end to an area of the other end in the width direction.

In the rear seat 100r, the covering 102 covers the cushion pad 110, with an end portion thereof drawn (slung) into the groove 113. By slinging an end portion of the covering 102 into the sling groove 113 in this manner, a moderate tension is given to each portion of the covering 102.

In addition, in the cushion pad 110 forming the rear seat 100r, a hole 114 penetrating the cushion pad 110 in the thickness direction is provided inside the sling groove 113. The hole 114 that is a slit with an approximately rectangular shape in a plan view, is provided to a bottom portion 113a of the sling groove 113. More specifically, as shown in FIG. 17, the hole 114 is provided to the bottom portion 113a in a center portion in the width direction of the sling groove 113. In the present embodiment, the bottom portion 113a of the sling groove 113 not only necessarily includes the deepest portion, but also includes a portion positioned slightly above the deepest portion of the sling groove 113.

Furthermore, in the cushion pad 110 forming the rear seat 100r, an adjacent portion 115 is provided to a position adjacent to the sling groove 113 in the opposite side of the bank portion 112. More specifically, in the cushion pad 110 forming the rear seat 100r, the adjacent portion 115 that slightly rises upward from the surrounding is provided to a position adjacent to the sling groove 113, in the fore side of the sling groove 113, as shown in FIG. 16 and FIG. 17. The adjacent portion 115 is provided along the sling groove 113, and extends over a comparatively long distance from an area of one end to an area of the other end of the cushion pad 110 in the width direction.

In addition, as shown in FIG. 18, a concave portion 116 with a groove shape is formed on a bottom face 119 of the cushion pad 110 forming the rear seat 100r (the face positioned in the opposite side of the supporting face 111 in the thickness direction). The concave portion 116 extends forward straight from an end portion adjacent to the sling groove 113, specifically, from an edge of the hole 114, in a portion positioned in the backside of the adjacent portion 115 in the cushion pad 110.

Furthermore, as shown in FIG. 17, a notch 117 is formed on an end portion of the adjacent portion 115, in the side adjacent to the sling groove 113 (hereinbelow, the groove side-end 115a), in the cushion pad 110 forming the rear seat 100r. More specifically, in the groove side-end 115a, a center portion in the width direction which is adjacent to the hole 114 has a notch 117 with a rear end portion and an upper end portion thereof notched in a substantially rectangular shape. By forming this notch 117, the portion adjacent to the hole 114 of the groove side-end 115a is configured into a shape somewhat depressed from the surrounding (namely, offset forward).

The seat for two-wheeled vehicle 100 according to the present embodiment is equipped with an electric heater 120, in addition to the aforementioned components (the bottom plate 101, the cushion pad 110, and the covering 102). The electric heater 120 is used to heat the seat surface (specifically, a face which abuts buttocks of an occupant), and is arranged between the cushion pad 110 and the covering 102. More specifically, the electric heater 120 is attached to the supporting face 111 which is the upper end face of the cushion pad 110.

In the present embodiment, the fore seat 100f and the rear seat 100r are each provided with one electric heater 120, as shown in FIG. 15. That is, an electric heater 120 is attached to the supporting face 111 of the cushion pad 110 forming the fore seat 100f, and another electric heater 120 is attached to the supporting face 111 of the cushion pad 110 forming the rear seat 100r.

The electric heater 120 is operated by being supplied with electricity from a power source that is not illustrated. On/off of the electric heater 120 is controlled by a controller that is not illustrated (specifically, an ECU (Electronic Control Unit)). A composition, etc. of the electric heater 120 is described in detail, in the next section.

Composition of Electric Heater

Figure 20:
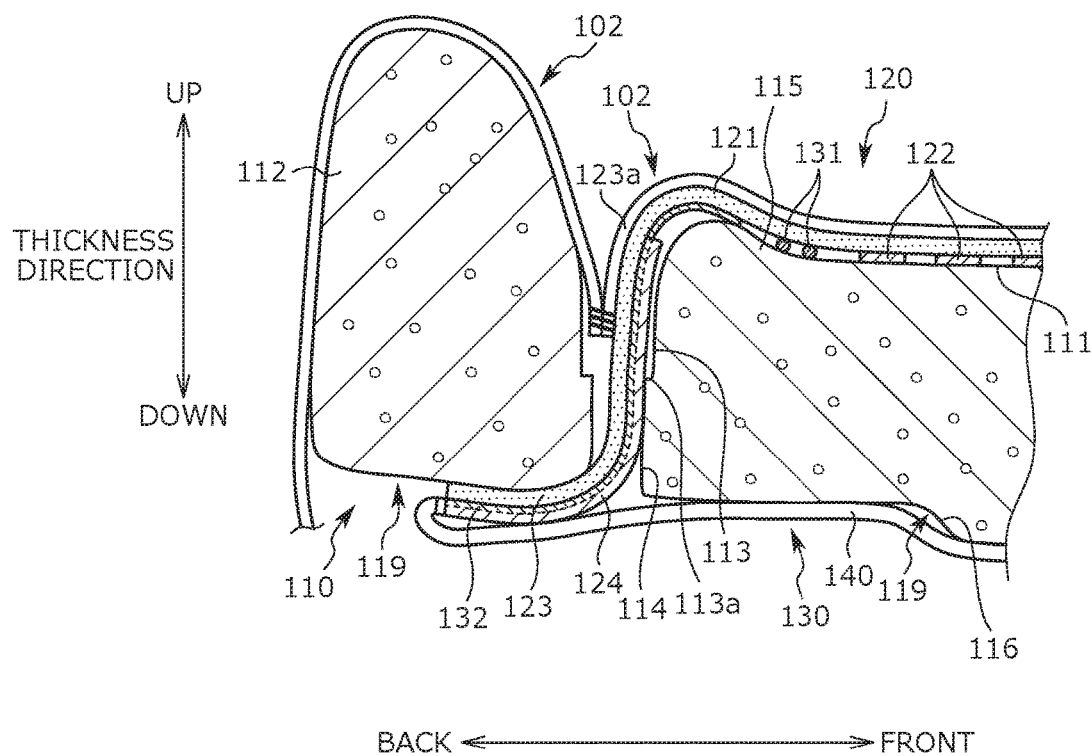
FIG. 20 is a cross-sectional schematic showing the A-A cross section of FIG. 14.
Figure 21:
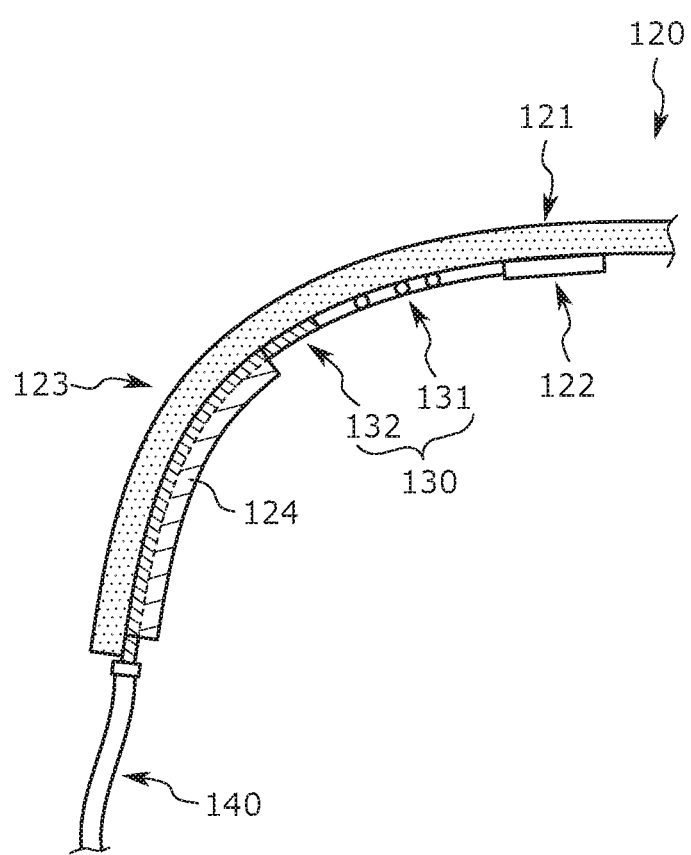
FIG. 21 is a schematic of a leading line fixed to an extending portion of a substrate.
Figure 22:
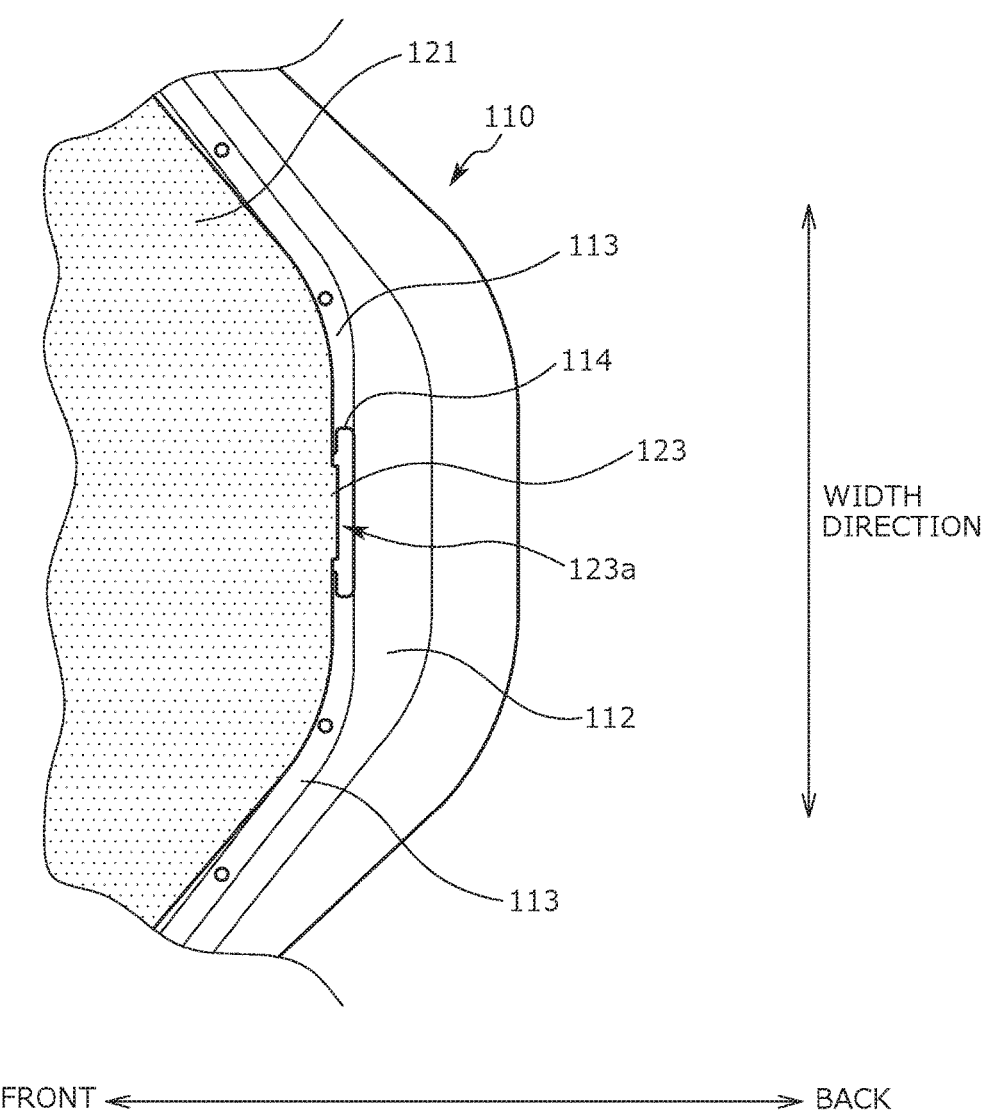
FIG. 22 is a schematic of one end portion of a cushion pad with an electric heater attached thereto, viewed from above.
Figure 23:
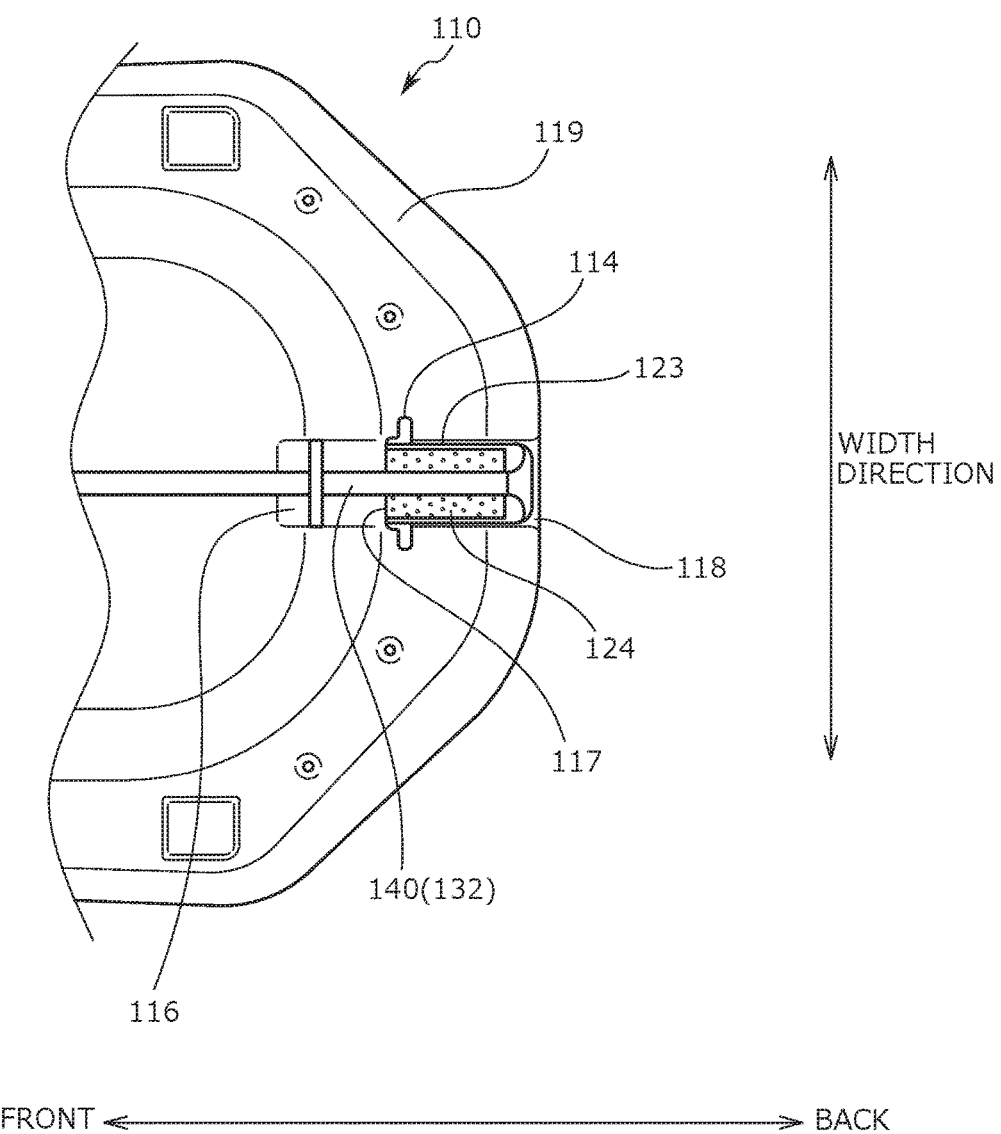
FIG. 23 is a schematic of one end portion of a cushion pad with an electric heater attached thereto, viewed from below.

A composition of the electric heater 120 and an arrangement position thereof are described, with reference to FIG. 19 that has already been referred to, together with FIG. 20 to FIG. 23. FIG. 20 is a cross-sectional schematic showing the A-A cross section of FIG. 14. FIG. 21 is a schematic showing an electricity supply cord 130 fixed to an extending portion 123 that is described below. FIG. 22 is a schematic of one end portion (specifically, a rear end portion) of the cushion pad 110 with the electric heater 120 attached thereto, viewed from above. FIG. 23 is a schematic of one end portion (specifically, a rear end portion) of the cushion pad 110 with the electric heater 120 attached thereto, viewed from below.

A composition is common between the electric heater 120 set in the fore seat 100f and the electric heater 120 set in the rear seat 100r. Therefore, hereinbelow, the electric heater 120 set in the rear seat 100r is given as an example, and a composition, etc. thereof is described.

The electric heater 120 comprises a pad substrate 121 and a heater line 122, as shown in FIG. 19 and FIG. 20. The pad substrate 121 is a substrate shaped into a pad somewhat thin as compared to the cushion pad 110, and used to fix the heater line 122. The pad substrate 121 is a pad comprising a rubber made closed foam material (specifically, ethylene propylene diene rubber) cut into a shape as illustrated in FIG. 19. Material of the pad substrate 121 is not particularly limited, but desirably has a moderate thermal conductivity and heat-retention property.

In a center portion in the width direction of the rear end portion (corresponding to the one end portion) of the pad substrate 121, an extending portion 123 extending in a shape of tongue is provided, as shown in FIG. 20 and FIG. 21. This extending portion 123 extends having a somewhat long length. To the back face of the extending portion 123 (a face in the side successive to the lower face of the pad substrate 121), a cushioning material 124 comprising a sponge body is attached, as shown in FIG. 21.

On the lower face of the pad substrate 121, the heater line 122 in a state of being turned several times is bonded with an adhesive or the like, as shown in FIG. 19. The pad substrate 121 is attached to the cushion pad 110 in such a state that the lower face to which the heater line 122 is bonded faces the supporting face 111 of the cushion pad 110.

The heater line 122 is an electric line which is heated by conducting electricity. To the heater line 122, a leading line for supplying electric power from a power source (hereinbelow, electricity supply cord 130) is electrically connected. The electricity supply cord 130 is routed from the power source to the heater line 122 for an electricity supply to the electric heater 120. In an in-between position of the electricity supply cord 130, joints (connecters) are provided at appropriate intervals.

In addition, the electricity supply cord 130 comprises a connecting portion 131 and the successive portion 132 as illustrated in FIG. 19 and FIG. 20. The connecting portion 131 is a portion connected to the heater line 122 of the electric heater 120, in the same side with the supporting face 111 in the thickness direction. The connecting portion 131 is bonded to the lower face of the pad substrate 121, similarly as the heater line 122. The successive portion 132 is a portion which is successive to the connecting portion 131. The successive portion 132 passes through a predetermined site in the cushion pad 110, and extends to become distant from the heater line 122 set on the supporting face 111.

A portion of the successive portion 132 is fixed to the backside of the extending portion 123 of the pad substrate 121, as shown in FIG. 21. More specifically, a portion of the successive portion 132 is fixed to the extending portion 123, and is sandwiched between the extending portion 123 and the cushioning material 124 bonded to the backside of the extending portion 123.

Further, a portion of the successive portion 132, in a position positioned forward of the portion fixed to the extending portion 123 (in the side nearer to the power source), extends in a state of forming a covered cable 140, as shown in FIG. 21.

Next, an arrangement position of the aforementioned electric heater 120 and the electricity supply cord 130 is described. The electric heater 120 is attached to the supporting face 111, in such a state that an edge of the rear end portion of the pad substrate 121 is positioned along the edge of the groove side-end 115a of the adjacent portion 115 (the edge adjacent to the sling groove 113) in the cushion pad 110, as shown in FIG. 19 and FIG. 21. More specifically, the pad substrate 121 is molded such that the rear end edge thereof substantially coincides with a shape of the sling groove 113. Then, the pad substrate 121 is placed on the supporting face 111, such that the rear end edge of the pad substrate 121 is lined up with a boundary position of the sling groove 113 and the adjacent portion 115 (namely, an edge of the groove side-end 115a), and fixed at the position.

The electricity supply cord 130 is routed to be connected to the heater line 122 with the connecting portion 131, and such that the successive portion 132 comes around to the backside of the cushion pad 110 from the side in which the supporting face 111 is positioned (the opposite side of the side in which the supporting face 111 is positioned). Specifically, in the successive portion 132, the portion adjacent to the connecting portion 131 is in a position in the same side in which the supporting face 111 is positioned, in the thickness direction, as shown in FIG. 20.

In the successive portion 132, a portion which is slightly distant from the connecting portion 131 is drawn into the sling groove 113, as shown in FIG. 20. Specifically, a portion of the successive portion 132 is fixed to the extending portion 123 of the pad substrate 121, specifically, sandwiched between the extending portion 123 and the cushioning material 124. Then, the successive portion 132 fixed to the extending portion 123 is drawn into the sling groove 113, together with the extending portion 123 and the cushioning material 124.

In addition, the successive portion 132 fixed to the extending portion 123 comes into the hole 114 formed in the bottom portion 113a of the sling groove 113, together with the extending portion 123 and the cushioning material 124. More specifically, the extending portion 123, to which the successive portion 132 is fixed, is bent downward in a shape of the letter L, at the edge of the groove side-end 115a, as shown in FIG. 20. Then, the extending portion 123, together with the cushioning material 124 and the successive portion 132 which is sandwiched between the extending portion 123 and the cushioning material 124, passes through the hole 114, and comes around to the backside of the cushion pad 110.

In the above manner, in the present embodiment, the connecting portion 131 of the electricity supply cord 130, connected to the heater line 122, is positioned in the same side with the supporting face 111 in the thickness direction, and the successive portion 132 passes through the hole 114. Moreover, the hole 114 is formed in the bottom portion 113a of the sling groove 113. Such position of formation of the hole 114 is a position where a load is difficult to be applied when an occupant is seated on the seat for two-wheeled vehicle 100. As a result, a load which is applied to the successive portion 132 passing through the hole 114 is decreased to allow inhibiting a disconnection of the successive portion 132. In addition, a portion of the successive portion 132 (specifically, the portion passed through the hole 114) passes through the hole 114 and is sandwiched between the extending portion 123 and the cushioning material 124. This allows inhibiting disconnection of the successive portion 132 more effectively, even if a sitting load is applied to the seat for two-wheeled vehicle 100, since a load applied to the successive portion 132 is alleviated by the cushioning material 124.

If the successive portion 132 in the electricity supply cord 130 is routed in a manner crossing a corner portion of the cushion pad 110 in the outer surface of the cushion pad 110, a load applied to the successive portion 132 become comparatively large, when an occupant is seated on the seat for two-wheeled vehicle 100. In such a case, there is a possibility that the successive portion 132 is disconnected.

In contrast, in the present embodiment, the successive portion 132 passes through the hole 114 formed in the bottom portion 113a of the sling groove 113 and comes around to the backside of the cushion pad 110 (the side of the bottom face 119). As such, the successive portion 132 does not cross a corner portion of the cushion pad 110, and the successive portion 132 is not applied with an excessive load at a sitting on the seat. As a result, in the present embodiment, a disconnection which occurs due to an excessive load applied to the successive portion 132 is inhibited.

In addition, in the present embodiment, when the successive portion 132 passes through the hole 114, the successive portion 132 passes through the hole 114 together with the extending portion 123 of the pad substrate 121 to which the successive portion 132 is fixed and the cushioning material 124. This allows the successive portion 132 to easily be passed through the hole 114. In addition, in the successive portion 132, the portion passing through the hole 114 is sandwiched between the extending portion 123 and the cushioning material 124, and thus, the portion is protected. In the present embodiment, the successive portion 132 of the electricity supply cord 130 is passed through the hole 114, together with the extending portion 123 and the cushioning material 124. However, the invention is not limited thereto, and it is also possible that only the successive portion 132 is passed through the hole 114.

In addition, the extending portion 123 to which the successive portion 132 is fixed is bent downward at the edge of the groove side-end 115a, as mentioned above. This bent portion (hereinbelow, bent portion 123a) comes into the notch 117 formed in a center portion in the width direction of the groove side-end 115a, as shown in FIG. 21. As a result, as shown in FIG. 21, the bent portion 123a which comes into the notch 117 has the end face in the same side with the sling groove 113 (hereinbelow, end face of bent portion 123a) flush with a face positioned in the edge of the groove side-end 115a (namely, the rear end face of the groove side-end 115a).

More specifically, the extending portion 123 is thick as compared to the other portions of the pad substrate 121, for having the successive portion 132 and the cushioning material 124 attached thereto. It is supposed that the rear end face of the groove side-end 115a is configured to be flush over the entire area. In this case, when the extending portion 123 is bent downward at the edge of the groove side-end 115a, a portion of the rear end face of the groove side-end 115a becomes overlapped with the extending portion 123 in the front to back direction. Then, in the portion where the rear end face of the groove side-end 115a and the extending portion 123 overlap with each other, the rear end face of the portion shifts somewhat rearward from the surrounding.

In contrast, in the present embodiment, the notch 117 is provided to the rear end portion of the groove side-end 115a, in a portion facing the bent portion 123a of the extending portion 123. Then, as shown in FIG. 20 and FIG. 22, the bent portion 123a comes into the notch 117. As a result, the end face of the bent portion 123a which has come into inside the notch 117 becomes substantially flush with the rear end face of the groove side-end 115a in the surrounding thereof. In other words, the notch 117 is formed such that the end face of the bent portion 123a which has come into inside the notch 117 becomes flush with the rear end face of the groove side-end 115a. More specifically, the notch 117 is formed by notching a center portion in the width direction of the rear end of the groove side-end 115a, in an amount according to a thickness of the extending portion 123 and the cushioning material 124 sandwiching the successive portion 132.

Then, the end face of the bent portion 123a which has come into the notch 117 is made flush with the rear end face of the groove side-end 115a, to thus allow suppression of an appearance of the seat for two-wheeled vehicle 100 from being influenced by the formation of the bent portion 123a. Particularly, it becomes possible to suppress irregularities or wrinkles of the covering 102 as much as possible in the portion where the bent portion 123a is positioned.

The extending portion 123, the cushioning material 124 and the successive portion 132 of the electricity supply cord 130 sandwiched therebetween, which have passed through the hole 114, and come around to the backside of the cushion pad 110, are arranged along the bottom face 119 of the cushion pad 110, as shown in FIG. 23. Specifically, the portion of each of the extending portion 123 and the cushioning material 124 which has passed through the hole 114 is bent to the backside of the cushion pad 110, as shown in FIG. 23. According thereto, the successive portion 132 sandwiched between the extending portion 123 and the cushioning material 124 is also bent to the backside of the cushion pad 110.

In the present embodiment, a hollow 118 that is depressed from the surrounding is formed in the rear end portion of the bottom face 119 of the cushion pad 110, in a site corresponding to a center portion in the width direction. This hollow 118 is formed into an approximately rectangular shape in a plan view, as shown in FIG. 18. Then, the extending portion 123 and the cushioning material 124 passed through the hole 114 and bent to the backside are arranged such that a portion of each comes into inside the hollow 118.

In the successive portion 132, a portion coming outside from the space between the extending portion 123 and the cushioning material 124 forms a covered cable 140, as shown in FIG. 23. Then the successive portion 132 that forms the covered cable 140 is turned back to the fore side, at the rear end position of the cushion pad 110. Further, the successive portion 132 which has been turned back comes into the concave portion 116 formed in the backside portion of the cushion pad 110. Specifically, the concave portion 116 is formed to be a groove with a cross section, to which the outer circumference of the covered cable 140 can fit. Since the successive portion 132 forming the covered cable 140 (specifically, a portion of the successive portion 132, which has passed through the hole 114 and reached a position facing the bottom face 119) comes into the concave portion 116 in the shape of such groove, the successive portion 132 is positioned to be appropriately routed.

So far, a composition, an arrangement position and a method of attachment in respect of each of the electric heater 120 and the electricity supply cord 130 in the rear seat 100r have been described. However, the composition, etc. described above are also applicable to the electric heater 120 and the electricity supply cord 130 in the fore seat 100f.

Third Embodiment

Hereinbelow, a seat 203 (an example of the conveyance seat) according to an embodiment (the third embodiment) of the present disclosure is described, with reference to FIG. 24 to FIG. 32. The seat 203 according to the present embodiment is an example of adopting the conveyance seat according to the present disclosure to a seat for an automatic two-wheeled vehicle. However, the seat 203 is merely an example for facilitating understanding of the present disclosure and does not limit the present disclosure. That is to say, a shape, a size, an arrangement, etc. of a member which is described hereinbelow can be altered or improved without deviated from the gist of the present disclosure, and as a matter of course, the present disclosure includes equivalents thereof. In addition, hereinbelow, each of a front to back direction, a right to left direction and an up to down direction coincides with each of the direction viewed from a seated person of the seat 203.

Figure 24:
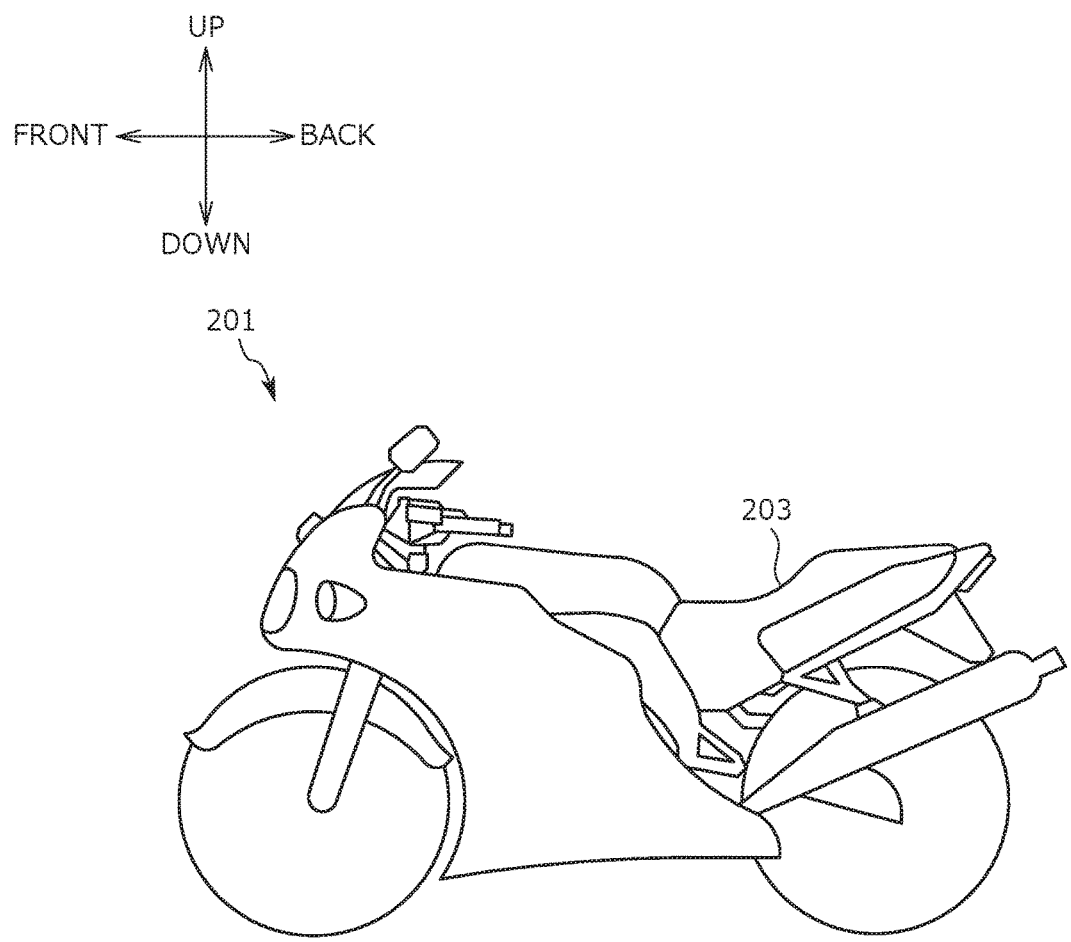
FIG. 24 is a side-view schematic showing an automatic two-wheeled vehicle, on which a seat according to the embodiment is mounted.

FIG. 24 shows an appearance of an automatic two-wheeled vehicle 201 on which the seat 203 according to the present embodiment is mounted. As shown in FIG. 24, the automatic two-wheeled vehicle 201 may have a composition similar to that of a general automatic two-wheeled vehicle, except for the seat 203. The seat 203 is an on-saddle type seat on which an occupant (a driver) is seated in a state of straddling it, which is provided to the automatic two-wheeled vehicle 201 to be attachable/detachable. Specifically, an attachment hole which is not illustrated is formed on the automatic two-wheeled vehicle 201, and the seat 203 is attached to the automatic two-wheeled vehicle 201 by using this attachment hole and a fastening tool.

Figure 25:
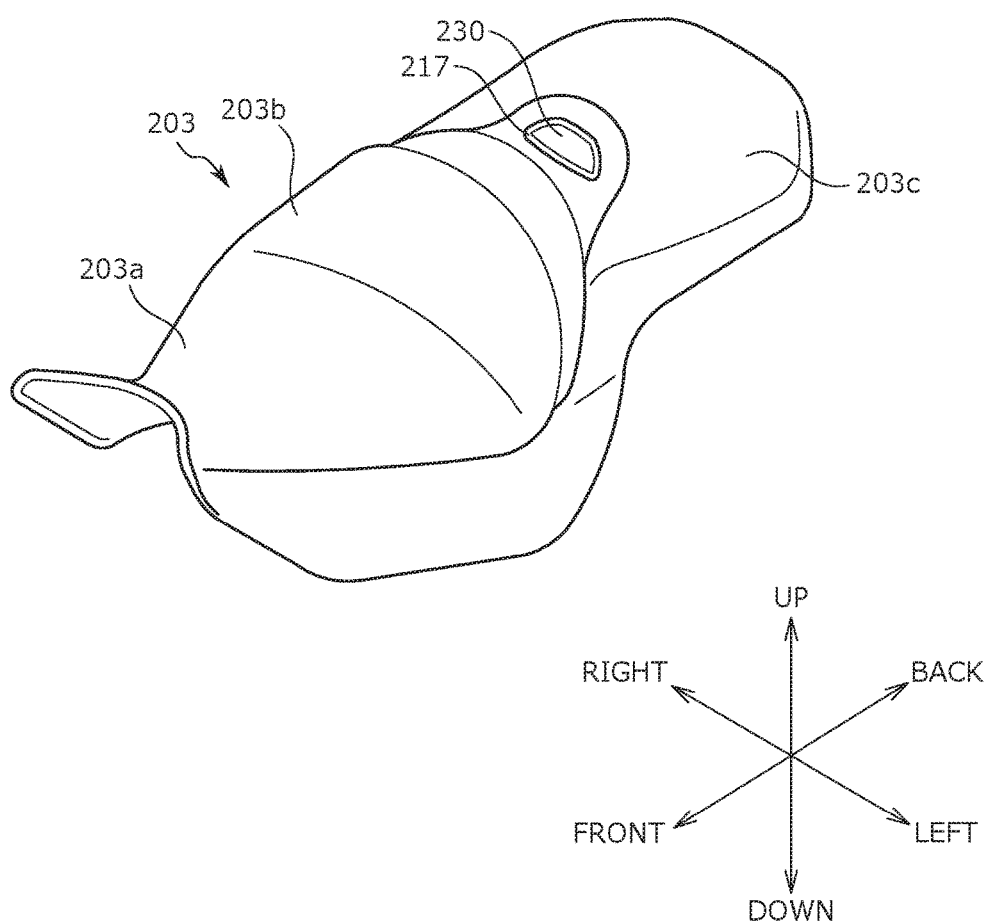
FIG. 25 is a perspective schematic of a seat.

Next, a composition of the seat 203 is described, with referring to FIG. 25. As shown in FIG. 25, the seat 203 comprises a seating portion 203a, an inclined portion 203b, and a rear portion 203c, in order from the front.

The seating portion 203a forms a face that supports buttocks of an occupant. The inclined portion 203b forms a face, which supports a waist of the occupant. Specifically, the inclined portion 203b links the seating portion 203a and the rear portion 203c, and forms a face obliquely inclined backward from the rear end of the seating portion 203a. The rear portion 203c connects to the inclined portion 203b, and is provided to a higher position relative to the seating portion 203a in the up to down direction. In the rear portion 203c, a through hole for attaching a backrest is formed, and in a state of having the backrest detached, a covering member 230 which closes the through hole is attached thereto, as shown in FIG. 25. In this state of having a backrest detached from the seat 203, the rear portion 203c can be used as a rear seat for a conveyance for two person.

Figure 26:
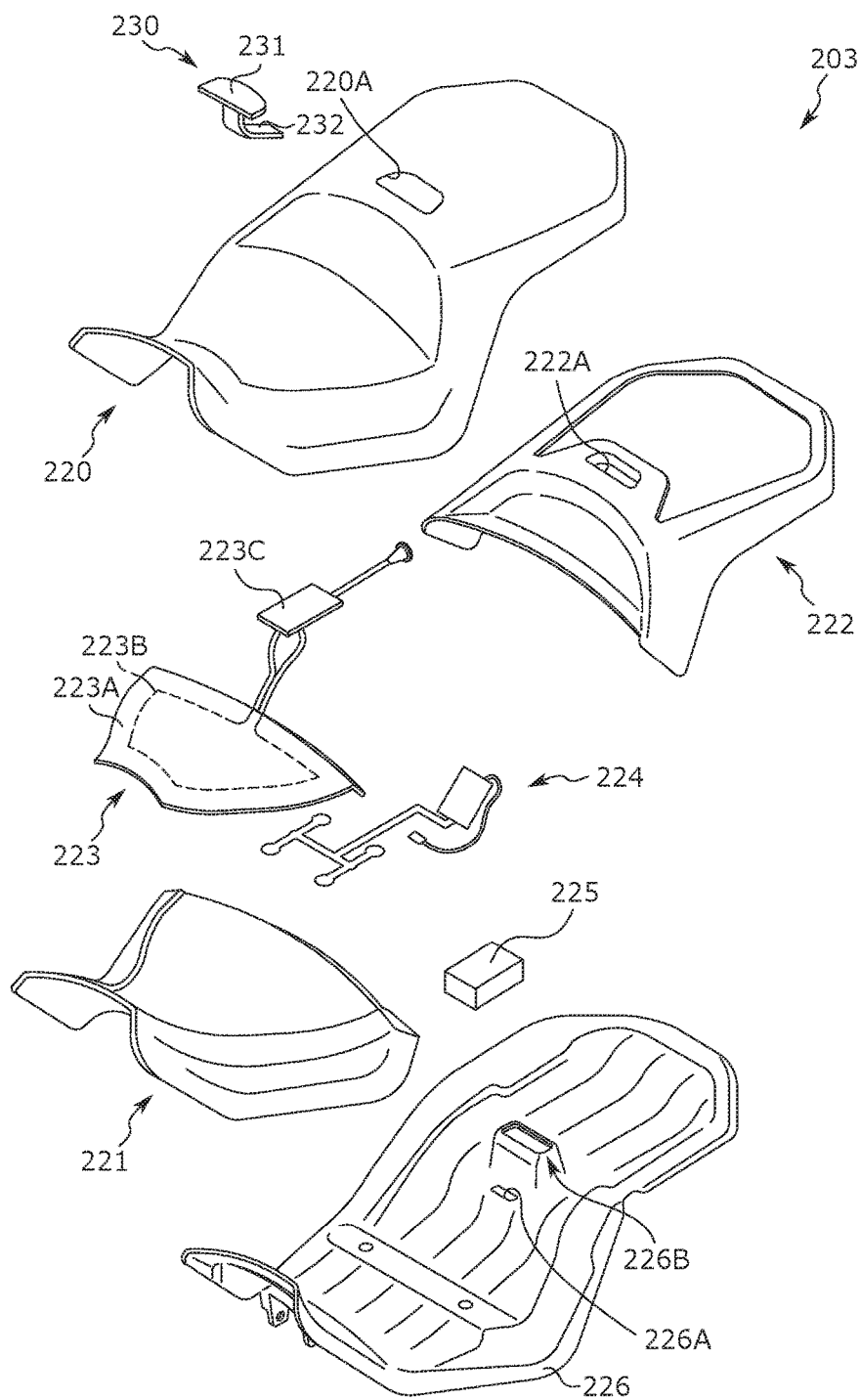
FIG. 26 is an exploded perspective schematic of a seat.

FIG. 26 shows an exploded, perspective schematic of the seat 203. As shown in FIG. 26, the seat 203 comprises a resin frame 226 (an example of the supporting member), a fore cushion member 221, a thermistor supporting member 225, a membrane switch 224, a seat heater 223, a rear cushion member 222, a covering material 220, and a covering member 230.

The resin frame 226 is a frame member made of a synthetic resin. In the present embodiment, a through hole 226A is formed in a center portion of the resin frame 226, and rearward thereof, an opening 226B is formed.

The fore cushion member 221 (an example of the second cushion member) is a cushion member arranged over the resin frame 226, in the fore portion of the resin frame 226. For example, an urethane foam may be used in the fore cushion member 221. The fore cushion member 221 is a cushion member arranged in a position of the seating portion 203a of the seat 203.

The rear cushion member 222 is a cushion member arranged over the resin frame 226, from the inclined portion in the center to the rear portion of the resin frame 226. For example, an urethane foam may be used in the rear cushion member 222. The rear cushion member 222 is a cushion member arranged in a position of the inclined portion 203b and the rear portion 203c of the seat 203.

The membrane switch 224 is a seating sensor which detects a sitting state of an occupant on the seating portion 203a of the seat 203. Hereinbelow, the membrane switch 224 is described, with referring to FIG. 27.

Figure 27:
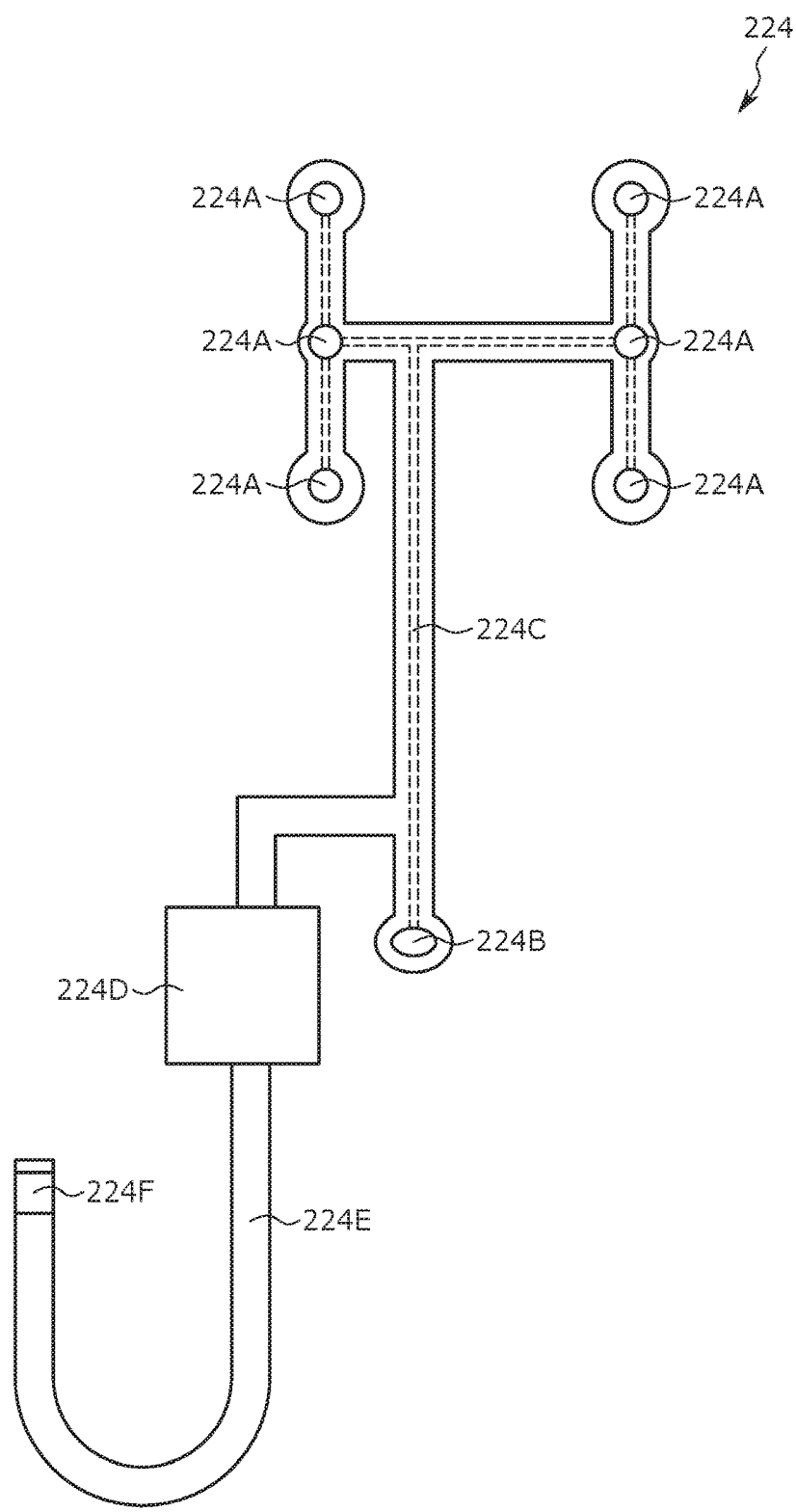
FIG. 27 is a schematic illustrating a composition of a membrane switch.

As shown in FIG. 27, the membrane switch 224 is equipped with a plural number of contact point units 224A, an intake/exhaust port unit 224B, a communicating unit 224C, a circuit portion 224D, a harness 224E, and a connector 224F.

The contact point units 224A are upper and lower electrodes arranged via an air layer. When a load from above is applied to a contact point unit 224A, the upper and the lower electrodes are brought into contact. Here, each of the contact point units 224A are joined to the intake/exhaust port unit 224B via the communicating unit 224C which is a path of the air, and the air between the upper and lower electrodes of the contact point units 224A comes in and out through the communicating unit 224C and the intake/exhaust port unit 224B.

The circuit unit 224D detects an ON signal which indicates that an upper and a lower electrodes have brought into contact at each of the contact point units 224A, and outputs the detected ON signal to an ECU of the automatic two-wheeled vehicle 201 via the harness 224E and the connector 224F which is provided to an end portion of the harness 224E.

Here, an arrangement of the membrane switch 224 is described, with reference to FIG. 28 to FIG. 32.

Figure 28:
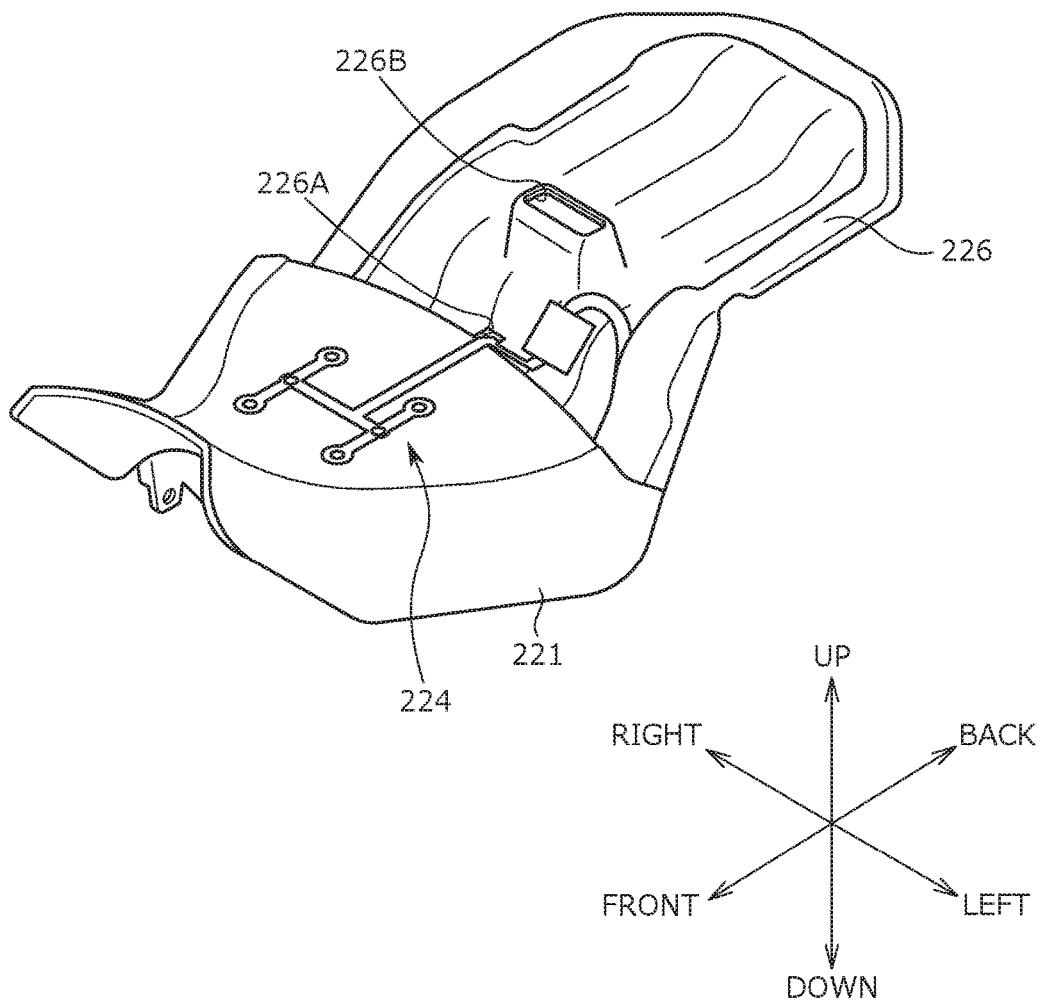
FIG. 28 is a perspective schematic of a resin frame, in a state of having a fore cushion member and a membrane switch built thereon.

As shown in FIG. 28 and FIG. 29, the contact point units 224A of the membrane switch 224 are arranged on the fore cushion member 221.

Then, as shown in FIG. 28 to FIG. 32, the intake/exhaust port unit 224B of the membrane switch 224 is arranged to be exposed from below the resin frame 226, through the through hole 226A of the resin frame 226.

Figure 30:
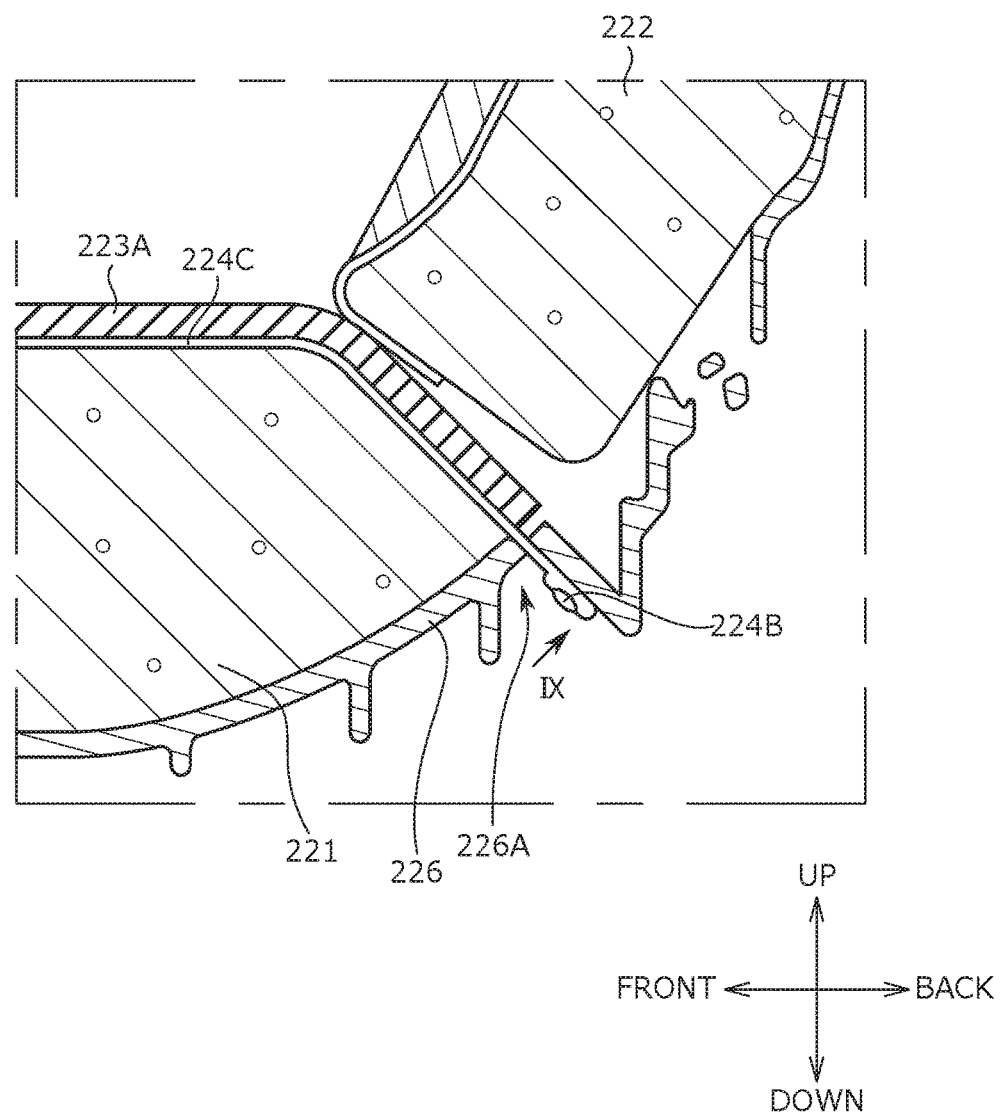
FIG. 30 is a cross-sectional schematic showing the VII-VII cross section in a through hole area.

In addition, as shown in FIG. 26 and FIG. 30, a seat heater 223 is arranged over the contact point units 224A of the membrane switch 224. The seat heater 223 comprises a rubber seat 223A (an example of the first cushion member), a heater line 223B and a thermistor 223C.

The rubber seat 223A is a cushion member arranged over the cushion member 221. In other words, the rubber seat 223A is a cushion member arranged in the position of the seating portion 203a of the seat 203 in a top view, and above the resin frame 226 in a side view. Used as the rubber seat 223A is, for example, a rubber material obtained by cross-linking a rubber raw material by addition of sulfur. This increases an elastic modulus of the rubber seat 223A, and enhances a cushioning property. On a surface of the rubber seat 223A (the lower face or the upper face), the heater line 223B is bonded.

The heater line 223B is connected to the thermistor 223C, and an electric conduction is controlled according to a temperature control by the thermistor 223C.

Figure 31:
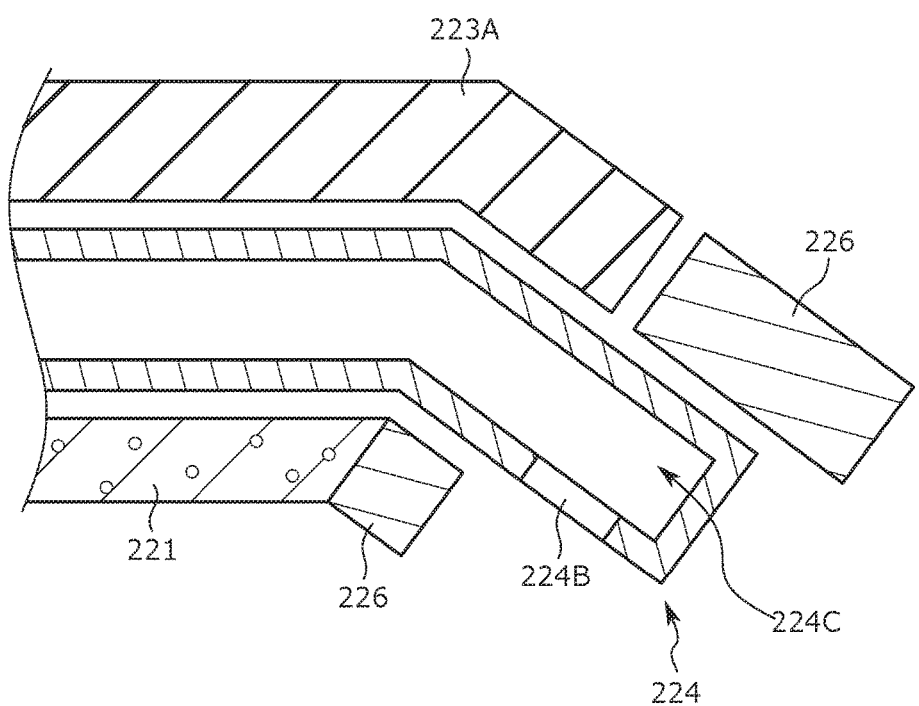
FIG. 31 is a side view schematic showing a composition of surrounding of an intake/exhaust port unit area.
Figure 32:
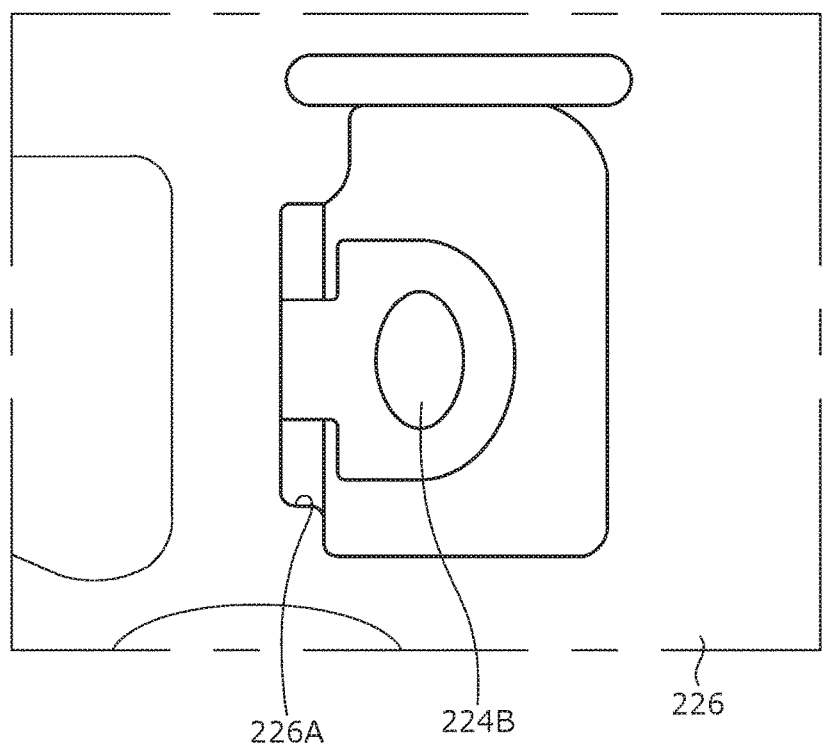
FIG. 32 is a schematic in the direction IX of FIG. 30.

As shown in FIG. 30 and FIG. 31, it is possible to arrange the intake/exhaust port unit 224B to a position separated from the rubber seat 223A, by arranging the intake/exhaust port unit 224B to be appeared from the through hole 226A of the resin frame 226, to the outside of the resin frame 226. By arranging in this manner such that the intake/exhaust port unit 224B of the membrane switch 224 is separated from the rubber seat 223A, it is possible to inhibit a sulfur component of the rubber seat 223A from being taken in from the intake/exhaust port unit 224B.

If a sulfur component is taken in from the intake/exhaust port unit 224B, there is a concern that the sulfur component reaches a contact point unit 224A through the communicating unit 224C, and reacts with silver contained in an electrode of the contact point unit 224A (sulfuration), to cause a contact failure of the contact point unit 224A. In contrast, in the seat 203 according to the present embodiment, it is possible to inhibit a sulfur component contained in the rubber seat 223A from being taken in from the intake/exhaust port unit 224B, by arranging the intake/exhaust port unit 224B of the membrane switch 224 to below the resin frame 226 through the through hole 226A of the resin frame 226. In this manner, it is possible to inhibit the reaction of silver contained in an electrode of a contact point unit 224A with the sulfur component (sulfuration) to cause a contact failure of the contact point unit 224A.

As shown in FIG. 28 and FIG. 29, the circuit unit 224D and the harness 224E of the membrane switch 224 are arranged in the side of the opening 226B of the resin frame 226. Since the surrounding of the opening 226B is a level higher, it is possible to prevent a load from above from being applied to the circuit unit 224D and the harness 224E, to protect the circuit unit 224D and the harness 224E.

In addition, as shown in FIG. 26, the thermistor supporting member 225 is arranged below the thermistor 223C of the seat heater 223. The thermistor supporting member 225 comprises a cushioning material such as urethane foam, and it is possible to protect the thermistor 223C with the thermistor supporting member 225.

The rear cushion member 222 is placed on the rear portion of the resin frame 226. Here, the opening 226B of the resin frame 226 is arranged in a position facing the opening 222a of the rear cushion member 222.

In the above manner, the fore cushion member 221, the thermistor supporting member 225, the membrane switch 224, the seat heater 223, and the rear cushion member 222 are placed on the resin frame 226, and thereafter, the upper face is covered with the covering material 220 and an end portion of the covering material 220 is rolled in the lower face of the resin frame 226 and fixed thereto. An opening 220a formed in the covering material 220 is arranged to a position facing the opening 222a of the rear cushion member 222 and the opening 226B of the resin frame 226. In this manner, a through hole penetrating the opening 220a, the opening 222a, and the opening 226B is formed in the seat 203. To the through hole, an engagement member 217 which is engaged with the covering member 230 is attached.

As shown in FIG. 26, the covering member 230 comprises a lid unit 231 and a downward extending portion 232 that extends downward from the lid unit 231.

The lid unit 231 has a substantially rectangular shape of plate that closes a through hole formed in the rear portion 203c of the seat 203. The upper face of the lid unit 231 may be slightly curved, to be smoothly joined to the upper face of the seat 203, when the covering member 230 is attached to the engagement member 217.

The downward extending portion 232 is a portion with a tongue-like shape extending downward from an approximate center portion in the lower face of the lid unit 231. In the end portion in the lower side of the downward extending portion 232, a hole is formed, which latches to a protruding portion formed on the lower face of the resin frame 226. In this manner, it is possible to inhibit the covering member 230 from being easily detached from the seat 203.

In the seat 203 described above, it is possible to prevent the intake/exhaust port unit 224B of the membrane switch 224 from being crushed by a load of an occupant, since the intake/exhaust port unit 224B of the membrane switch 224 has been arranged through the through hole 226A of the resin frame 226. In this manner, it is possible to secure an intake/exhaust function of the membrane switch 224, and to improve an operation accuracy of the membrane switch 224. It is also possible to prevent a damage of the intake/exhaust port unit 224B of the membrane switch 224.

In addition, in the seat 203, intake of the outside air from the intake/exhaust port unit is facilitated by arranging the intake/exhaust port unit 224B below the resin frame 226 through the through hole 226A of the resin frame 226. It is also possible to inhibit a composition material of the rubber seat 223A (such as a sulfur component) from being taken in from the intake/exhaust port unit 224B, since the intake/exhaust port unit 224B can be separated from the rubber seat 223A.

In the seat 203, it is also possible to protect the membrane switch 224, by sandwiching the membrane switch 224 with the rubber seat 223A and the fore cushion member 221.

In the seat 203, it is also possible to enhance an elasticity, since the rubber seat 223A contains a sulfur component. This improves a seating feel of the seating portion 203a of the seat 203. In a case where the rubber seat 223A contains a sulfur component, it is possible to inhibit the sulfur component from being taken in from the intake/exhaust port unit 224B to cause a contact failure of the contact point unit 224A, by increasing a distance between the intake/exhaust port unit 224B and the rubber seat 223A.

In the seat 203, it is also possible to improve comfort of the seat 203, by equipping the seat heater 223 which is arranged over the membrane switch 224. In this manner, it is possible to prevent a dew condensation produced by a heat of the seat heater 223 from immersing inside of the membrane switch 224. In this manner, it is possible to prevent a corrosion of the membrane switch 224, to extend life of the membrane switch 224. Also, in a case where the seat 203 has the seat heater 223, it is possible to arrange the intake/exhaust port unit 224B of the membrane switch 224 to a position which is not in contact with the seat heater 223, and thus, it is possible to inhibit deterioration of the intake/exhaust port unit 224B due to heat.

The present disclosure is not limited to the above embodiments. For example, the intake/exhaust port unit 224B of the membrane switch 224 may be housed in the through hole 226A of the resin frame 226. The through hole 226A, through which the intake/exhaust port unit 224B of the membrane switch 224 is inserted, may not only be formed in the lower portion of the resin frame 226, but also be formed in the side portion of the resin frame 226. In the first cushion member, it is also possible to use a cushioning material comprising a material other than rubbers such as urethane foam. The conveyance seat according to the present disclosure is not only applicable to a seat of automatic two-wheeled vehicles, but also applicable to a seat of cars (including three or more-wheeled vehicles), ships, aircrafts, etc.

TABLE OF REFERENCE NUMERALS

| | |
|---|---|
| 10 | Bottom plate |
| 11 | Fore portion |
| 12 | Rear portion |
| 13 | Inclined wall (Protruding portion, Fore wall) |
| 14 | Convex portion for backrest attachment (Protruding portion, Convex portion) |
| 14a | Insertion hole |
| 15 | Lateral side standing wall (Protruding portion, Lateral side wall) |
| 16 | Attachment unit |
| 17 | Positioning rib |
| 18 | Housing cavity (Housing unit) |
| 20 | Cushion pad |
| 21 | Housing cavity (Housing unit) |
| 22 | Cable housing cavity (Concave portion) |
| 30 | Electric heater (Temperature control unit) |
| 31 | Substrate |
| 40 | Thermistor (Temperature detection unit) |
| 41 | Non-woven fabric |
| 50 | Holding pad (Holding unit) |
| C | Cable |
| R | Covering |
| S | Seat for two-wheeled vehicle (Conveyance seat) |
| Sb | Backrest |
| Sc | Resin cover |
| Sf | Fore seat |
| Sr | Rear seat |
| St | Level difference |
| Sx | Seat for two-wheeled vehicle according to the variation |
| V | Automatic two-wheeled vehicle (Conveyance) |
| 101 | Bottom plate |
| 102 | Covering |
| 110 | Cushion pad |
| 111 | Supporting face |
| 112 | Bank portion |
| 113 | Sling groove (Groove) |
| 113a | Bottom portion |
| 114 | Hole |
| 115 | Adjacent portion |
| 115a | Groove side-end |
| 116 | Concave |
| 117 | Notch |
| 118 | Hollow |
| 119 | Bottom face |
| 120 | Electric heater |
| 121 | Pad substrate (Substrate) |
| 122 | Heater line |
| 123 | Extending portion |
| 123a | Bent portion |
| 124 | Cushioning material |
| 130 | Electricity supply cord (Leading line) |
| 131 | Connecting portion |
| 132 | Successive portion |
| 140 | Covered cable |
| 100 | Seat for two-wheeled vehicle (Conveyance seat) |
| 100f | Fore seat |
| 100r | Rear seat |
| 201 | Automatic two-wheeled vehicle |
| 203 | Seat (Conveyance seat) |
| 203a | Seating portion |
| 203b | Inclined portion |
| 203c | Rear portion |
| 217 | Engagement member |
| 220 | Covering material |
| 220a | Opening |
| 221 | Fore cushion member (Second cushion member) |
| 222 | Rear cushion member |
| 222a | Opening |

TABLE OF REFERENCE NUMERALS-continued

| | |
|---|---|
| 223 | Seat heater |
| 223A | Rubber seat (First cushion member) |
| 223B | Heater line |
| 223C | Thermistor |
| 224 | Membrane switch (Seating sensor) |
| 224A | Contact point unit |
| 224B | Intake/exhaust port unit |
| 224C | Communicating unit |
| 224D | Circuit unit |
| 224E | Harness |
| 224F | Connector |
| 225 | Thermistor supporting member |
| 226 | Resin frame (Supporting member) |
| 226A | Through hole |
| 226B | Opening |
| 230 | Covering member |
| 231 | Lid unit |
| 232 | Downward extending portion |

What is claimed is:

1. A conveyance seat comprising:
   a cushion pad;
   a bottom wall on which the cushion pad is placed;
   a temperature control unit which is attached to the cushion pad;
   a temperature detection unit configured to detect a temperature at a location between the cushion pad and the bottom wall, during an operation of the temperature control unit;
   a housing unit with a hollowed shape which is formed on either one of the cushion pad or the bottom wall, in a portion facing an other of the cushion pad or the bottom wall; and
   a holding unit which is fit in the housing unit, with the temperature detection unit attached thereto, to thereby hold the temperature detection unit within the housing unit;
   wherein:
   the temperature detection unit is held by the holding unit and positioned between the cushion pad and the holding unit within the housing unit;
   the bottom wall has a protruding portion that protrudes at a position adjacent to the holding unit;
   the protruding portion is a convex portion that protrudes toward a side of the bottom wall on which the cushion pad is positioned and in a thickness direction of the conveyance seat; and
   a protrusion size of the convex portion is longer than a length of the holding unit in the thickness direction.

2. The conveyance seat according to claim 1, wherein:
   the protruding portion is in contact with a bottom face of the cushion pad.

3. The conveyance seat according to claim 2, wherein:
   the protruding portion is a fore wall provided forward of the holding unit in the front to back direction of the conveyance seat; and
   the fore wall protrudes toward a side in which the cushion pad is positioned and in the thickness direction of the conveyance seat.

4. The conveyance seat according to claim 1, wherein:
   the temperature detection unit outputs a signal according to a detected temperature;
   a cable that forms a transmission path for the signal is connected to the temperature detection unit;
   the housing unit is formed in a bottom portion of the cushion pad;

a concave portion, for a portion of the cable coming outside of the housing unit from an end of the housing unit, is formed in a bottom portion of the cushion pad that is adjacent to the housing unit.

5. The conveyance seat according to claim 1, wherein:
the temperature detection unit is attached to the holding unit and is wrapped with a cushioning material; and
the cushioning material that wraps the temperature detection unit is sandwiched between the holding unit and the cushion pad in the housing unit.

6. The conveyance seat according to claim 1, wherein:
the conveyance seat is mounted on a conveyance and exposed outward; and
the holding unit comprises a cushioning material having a thermal-insulating property.

7. The conveyance seat according to claim 1, further comprising:
a supporting member in which a through hole is formed;
a first cushion member arranged above the supporting member; and
a seating sensor arranged between the supporting member and the first cushion member;
wherein:
the seating sensor comprises
a contact point unit; and
an intake/exhaust port unit which communicates with the contact point unit; and
the intake/exhaust port unit is passed through the through hole of the supporting member.

8. The conveyance seat according to claim 7, wherein the intake/exhaust port unit is passed through the through hole of the supporting member, and is arranged below the supporting member.

9. The conveyance seat according to claim 7, further comprising a second cushion member arranged over the supporting member;
wherein:
the first cushion member is arranged above the second cushion member; and
the seating sensor is arranged between the first cushion member and the second cushion member.

10. The conveyance seat according to claim 7, wherein the first cushion member comprises a rubber material comprising a sulfur component.

11. The conveyance seat according to claim 7, further comprising a seat heater arranged over the seating sensor.

12. A conveyance seat comprising:
a cushion pad;
a bottom wall on which the cushion pad is placed;
a temperature control unit which is attached to the cushion pad;
a temperature detection unit configured to detect a temperature at a location between the cushion pad and the bottom wall, during an operation of the temperature control unit;
a housing unit with a hollowed shape which is formed on either one of the cushion pad or the bottom wall, in a portion facing an other of the cushion pad or the bottom wall; and
a holding unit which is fit in the housing unit, with the temperature detection unit attached thereto, to thereby hold the temperature detection unit within the housing unit;
wherein:
the temperature detection unit is held by the holding unit and positioned between the cushion pad and the holding unit within the housing unit;
the bottom wall has a protruding portion that protrudes at a position adjacent to the holding unit;
the protruding portion is a lateral side wall provided in an outer side of the bottom wall relative to the holding unit in a width direction of the conveyance seat; and
the lateral side wall protrudes toward a side in which the cushion pad is positioned, in the thickness direction of the conveyance seat.

13. The conveyance seat of claim 12, wherein the protruding portion is in contact with a bottom face of the cushion pad.

14. The conveyance seat of claim 12, wherein:
the temperature detection unit is attached to the holding unit and is wrapped with a cushioning material; and
the cushioning material that wraps the temperature detection unit is sandwiched between the holding unit and the cushion pad in the housing unit.

15. A conveyance seat comprising:
a cushion pad;
a bottom wall on which the cushion pad is placed;
a temperature control unit which is attached to the cushion pad;
a temperature detection unit configured to detect a temperature at a location between the cushion pad and the bottom wall, during an operation of the temperature control unit;
a housing unit with a hollowed shape which is formed on either one of the cushion pad or the bottom wall, in a portion facing an other of the cushion pad or the bottom wall; and
a holding unit which is fit in the housing unit, with the temperature detection unit attached thereto, to thereby hold the temperature detection unit within the housing unit wherein:
the temperature detection unit is held by the holding unit and positioned between the cushion pad and the holding unit within the housing unit;
the cushion pad comprises
a bank portion provided to a peripheral portion,
a groove provided to a position adjacent to the bank portion, and
a supporting face which supports an occupant;
the conveyance seat further comprises:
a covering which covers the cushion pad, where an end portion thereof is drawn into the groove,
an electric heater attached to the supporting face, and
a leading line provided for electric power supply to the electric heater;
the cushion pad has a hole formed on a bottom portion of the groove; and
the leading line comprises
a connecting portion connected to the electric heater on a same side as the supporting face in the thickness direction of the cushion pad, and
a successive portion which is successive to the connecting portion and is passed through the hole.

16. The conveyance seat according to claim 15, wherein:
a concave portion is formed on a bottom face of the cushion pad, which is positioned in the opposite side of the supporting face in the thickness direction; and
a portion of the successive portion which has passed through the hole and reached to a position facing the bottom face comes into the concave portion.

17. The conveyance seat according to claim 15, wherein:
the cushion pad comprises an adjacent portion which is adjacent to the groove, in the opposite side of the bank portion;
the electric heater comprises a substrate shaped into a pad, and attached to the supporting face, so that an edge of one end portion of the substrate is along an edge, in the groove side-end adjacent to the groove, of the adjacent portion;
the one end portion of the substrate comprises an extending portion which extends to fix the successive portion; and
the extending portion is bent downward at an edge of the groove side-end and is passed through the hole together with the successive portion.

18. The conveyance seat according to claim 17, wherein:
a notch is provided to the groove side-end of the adjacent portion, in a portion that faces the extending portion; and
the bent portion of the extending portion is bent downward at an edge of the groove side-end and comes into the notch.

19. The conveyance seat according to claim 18, wherein the notch is formed such that the bent portion which has come into the notch has the end face in the same side with the groove flush with a face positioned in an edge of the groove side-end.

20. The conveyance seat according to claim 17, wherein:
a cushioning material is attached to the extending portion;
the successive portion is fixed to the extending portion and is sandwiched between the extending portion and the cushioning material; and
the extending portion passes through the hole together with the successive portion and the cushioning material.

* * * * *